US010149335B2

(12) United States Patent
Gujral et al.

(10) Patent No.: US 10,149,335 B2
(45) Date of Patent: Dec. 4, 2018

(54) CONNECTIVITY MODULE FOR INTERNET OF THINGS (IOT) DEVICES

(71) Applicant: QUALCOMM Incorporated, San Diego, CA (US)

(72) Inventors: Sunvir Gujral, San Diego, CA (US); Kenneth Swinson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 14/804,759

(22) Filed: Jul. 21, 2015

(65) Prior Publication Data

US 2016/0135241 A1 May 12, 2016

Related U.S. Application Data

(60) Provisional application No. 62/077,877, filed on Nov. 10, 2014.

(51) Int. Cl.
*H04W 4/00* (2018.01)
*H04W 76/14* (2018.01)
(Continued)

(52) U.S. Cl.
CPC ............. *H04W 76/14* (2018.02); *H04L 67/12* (2013.01); *H04W 4/70* (2018.02)

(58) Field of Classification Search
CPC ...... H04L 67/24; H04L 67/12; H04L 43/0876
See application file for complete search history.

(56) References Cited

U.S. PATENT DOCUMENTS

2007/0106892 A1* 5/2007 Engberg ................. G06Q 20/02
713/168
2010/0029302 A1* 2/2010 Lee ........................ H04W 4/02
455/456.6

(Continued)

FOREIGN PATENT DOCUMENTS

| CN | 101984706 A | 3/2011 |
| CN | 202856780 U | 4/2013 |
| CN | 103179208 A | 6/2013 |

OTHER PUBLICATIONS

Anonymous: "ZigBee—Wikipedia", Nov. 7, 2014 (Nov. 7, 2014), pp. 1-10, XP055313430, Retrieved from the Internet: URL: https://en.wikipedia.org/w/index.php?title=ZigBee&oldid=632845358 [retrieved on Oct. 24, 2016].

(Continued)

*Primary Examiner* — Melanie Jagannathan
(74) *Attorney, Agent, or Firm* — Muncy, Geissler, Olds & Lowe, P.C.

(57) ABSTRACT

The disclosure relates to an Internet of Things (IoT) connectivity module that can add connectivity to an otherwise non-connected host and simplify procedures to connect, configure, and enable device-to-device (D2D) communication between the host and various heterogeneous IoT devices. For example, according to various aspects, the connectivity module may comprise a connectivity chip configured to implement a wireless network platform (e.g., a radio-frequency front end and one or more wireless radios), one or more standard peripheral interfaces configured to interconnect the connectivity module to a host having at least one processor, and a D2D application configured to implement a proximal D2D communication framework and expose a command protocol associated with the proximal D2D communication framework via the standard peripheral interfaces. Furthermore, according to vari- (Continued)

ous aspects, the connectivity module may comprise a dedicated interrupt line that may be asserted to notify the host when data becomes available to consume.

16 Claims, 20 Drawing Sheets

(51) Int. Cl.
*H04W 4/70* (2018.01)
*H04L 29/08* (2006.01)

(56) References Cited

U.S. PATENT DOCUMENTS

| | | | |
|---|---|---|---|
| 2013/0150108 A1* | 6/2013 | Yang | H04W 52/0216 455/509 |
| 2015/0006719 A1 | 1/2015 | Gupta et al. | |
| 2015/0019714 A1* | 1/2015 | Shaashua | H04L 67/24 709/224 |
| 2015/0033275 A1* | 1/2015 | Natani | H04N 21/42225 725/110 |
| 2015/0130824 A1* | 5/2015 | Lee | G06T 1/60 345/534 |
| 2015/0278798 A1* | 10/2015 | Lerch | G06Q 20/3278 705/39 |
| 2016/0028780 A1* | 1/2016 | Verzano | H04W 4/005 709/204 |

OTHER PUBLICATIONS

Atmel, "ZigBit 2.4GHz Single Chip Wireless Module ATZB-S1-256-3-0-C ZigBit 2.4GHz Single Chip Wireless Module [Datasheet] Table of Contents," Mar. 31, 2014 (Mar. 31, 2014), XP055247807, Retrieved from the Internet: URL:http://www.atmel.com/Images/Atmel-42191-Wireless-ZigBit-ATZB-S1-256-3-0-C_Datasheet.pdf.
International Search Report and Written Opinion—PCT/US2015/054702—ISA/EPO—dated Feb. 12, 2016.

* cited by examiner

CONNECTIVITY MODULE FOR INTERNET OF THINGS (IOT) DEVICES

CROSS-REFERENCE TO RELATED APPLICATIONS

The present application claims the benefit of U.S. Provisional Patent Application Ser. No. 62/077,877, entitled "CONNECTIVITY MODULE FOR INTERNET OF THINGS (IOT) DEVICES," filed Nov. 10, 2014, assigned to the assignee hereof, and hereby expressly incorporated herein by reference in its entirety.

TECHNICAL FIELD

The various aspects and embodiments described herein generally relate to a connectivity module for Internet of Things (IoT) devices, and more particularly, to providing a modular connectivity solution that can be used to abstract and simplify procedures to connect, configure, and enable device-to-device (D2D) communication across various different heterogeneous IoT devices.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet). A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations. Due at least in part to the potentially large number of heterogeneous IoT devices and other physical objects that may be in use within a controlled IoT network, which may interact with one another and/or be used in many different ways, well-defined and reliable communication interfaces are generally needed to connect the various heterogeneous IoT devices such that the various heterogeneous IoT devices can be appropriately configured, managed, and communicate with one another to exchange information. However, to the extent that certain existing communication frameworks can abstract and simplify adding IoT connectivity to existing devices, implementing the communication frameworks tends to be a tedious and error-prone process. For example, a non-connected "thing" that needs to be connected to an IoT network and/or other IoT devices will typically have a processor, most likely a micro-controller unit (MCU), which needs to be connected to the IoT network and/or the other IoT devices in order to make the non-connected thing a connected IoT device. Accordingly, in order to implement an appropriate communication framework and add connectivity to the non-connected thing, a manufacturer or developer has to learn the communication framework and define the relevant services, interfaces, configurations, methods, and logic associated with the communication framework.

Furthermore, not only do custom connectivity solutions require significant resources and tend to lack scalability to meet different end-uses, many original equipment manufacturers (OEMs) already have products with significant investments in incumbent MCU/processing and developing environments and therefore desire to have a "buttoned-up" connectivity solution that can be leveraged within existing development environments and from existing MCU/processor designs. As such, OEMs are seeking modular connectivity solutions that can be used across various heterogeneous products rather than a per-product connectivity paradigm. Nonetheless, despite the fact that OEMs desire low-cost and simple connectivity solutions that can implement multiple IoT solutions due to the dynamic nature of this emerging technology, existing connectivity solutions have fallen short in meeting the market demand.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a connectivity module architecture can simplify connecting non-connected "things" that may generally have a micro-controller unit (MCU) or other suitable processor that needs to be connected to other things (e.g., other Internet of Things (IoT) devices, one or more cloud services, etc.). In particular, the MCU/processor may be connected to an IoT connectivity module that may generally separate connectivity and processing associated with the thing, wherein the MCU/processor may connect to the IoT connectivity module over a standard peripheral interface, which may include an Inter-Integrated Circuit ($I^2C$) interface, a Serial Peripheral Interface (SPI), a Universal Asynchronous Receiver/Transmitter (UART) interface, a High-Speed Inter-Chip (HSIC) interface, or another suitable standard interface that the processor implements or otherwise supports. For example, assuming that the processor connects to the IoT connectivity module over an I²C interface, the connectivity module may appear like an I²C peripheral to the processor. Furthermore, the IoT connectivity module may implement a command protocol that implements various core services associated with a communication framework needed to connect the processor to other IoT devices, cloud services, etc., wherein the IoT connectivity module may further handle appropriate low-level details to connect to the other IoT devices, the one or more cloud services, etc. Accordingly, the IoT connectivity module may expose the command protocol to the processor over the standard interface, whereby the processor can configure the command protocol to connect to and communicate with other IoT devices or other nodes associated with a IoT network via the IoT connectivity module (e.g., over a proximity-based distributed bus that the processor may create and manage autonomously) and further to connect to and communicate with one or more cloud services and/or other network resources coupled to the IoT network According to various aspects, an IoT connectivity module may comprise a connectivity chip configured to implement a wireless network platform (e.g., a radio-frequency front end, one or more wireless radios, etc.), one or more standard peripheral interfaces configured to interconnect the IoT connectivity module to a host having at least one processor, and a device-to-device (D2D) application configured to implement a proximal D2D communication framework and expose a command protocol associated with the proximal D2D communication framework via the one or more standard peripheral interfaces. Furthermore, according to various aspects, the IoT connectivity module may comprise a dedicated interrupt line coupling the IoT connectivity module to the host, wherein the D2D application may assert the dedicated interrupt line in response to data becoming available to consume at the at least one processor. For example, according to various aspects, the standard peripheral interfaces and the dedicated interrupt line may comprise a physical interconnect between the IoT connectivity module and the host, an in-chip virtual interconnect, or any suitable combination thereof. In addition, according to various aspects, the IoT connectivity module may further comprise at least one application program interface configured to receive one or more commands associated with the exposed command protocol from the host over the one or more standard peripheral interfaces and to invoke one or more services associated with the proximal D2D communication framework in order to handle the one or more requests.

According to various aspects, an apparatus may comprise a connectivity chip configured to implement a wireless network platform, one or more standard peripheral interfaces configured to interconnect the apparatus to a host having at least one processor, and means for implementing a proximal D2D communication framework and exposing a command protocol associated with the proximal D2D communication framework via the one or more standard peripheral interfaces. Furthermore, according to various aspects, the apparatus may comprise means for notifying the host in response to data becoming available to consume at the at least one processor, wherein the one or more standard peripheral interfaces and the means for notifying the host may comprise a physical interconnect between the apparatus and the host and/or an in-chip virtual interconnect. According to various aspects, the apparatus may further comprise means for receiving one or more commands associated with the exposed command protocol from the at least one processor over the one or more standard peripheral interfaces and means for invoking one or more services associated with the proximal D2D communication framework to handle the one or more requests.

According to various aspects, a method for providing IoT connectivity may comprise interconnecting a hardware module that implements a wireless network platform to a host having at least one processor via one or more standard peripheral interfaces, exposing a command protocol associated with a proximal D2D communication framework implemented on the hardware module to the host via the one or more standard peripheral interfaces, and communicating data between the host and one or more nodes in an IoT network via the wireless network platform and the one or more standard peripheral interfaces according to the exposed command protocol associated with the proximal D2D communication framework. Furthermore, according to various aspects, the method may additionally comprise asserting a dedicated interrupt line coupled between the hardware module and the host in response to data becoming available to consume at the at least one processor, wherein the data available to consume at the at least one processor may be communicated to the host via the one or more standard peripheral interfaces in response to the host communicating a message to request the available data via the one or more standard peripheral interfaces. Alternatively (or additionally), the method may comprise receiving one or more commands associated with the exposed command protocol from the at least one processor over the one or more standard peripheral interfaces and invoking one or more services associated with the proximal D2D communication framework to handle the one or more requests, wherein the hardware module may notify the host in response to data associated with the one or more invoked services becoming available to consume at the at least one processor via a dedicated interrupt line and optionally further communicate the available data associated with the one or more invoked services to the host via the one or more standard peripheral interfaces in response to a message from the host requesting the available data associated with the one or more invoked services.

According to various aspects, an IoT device may comprise a host having at least one processor, an interconnect coupled to the host, the interconnect comprising a peripheral interconnect and a dedicated interrupt line, and a hardware module that comprises a connectivity chip configured to implement a wireless network platform, one or more standard peripheral interfaces configured to interconnect the hardware module to the host via the peripheral interconnect, and a D2D application configured to communicate data between the host and one or more nodes in an IoT network via the wireless network platform and the one or more standard peripheral interfaces according to a command protocol associated with a proximal D2D communication framework implemented on the hardware module and to assert the dedicated interrupt line in response to data becoming available to consume at the host. As such, according to various aspects, the hardware module may be integrated with the host via the peripheral interconnect to support various IoT device use cases, which may include an analog device, a digital device, a multi-functional analog and digital device, a maker board having a particular form factor, and a lighting controller used to control a lighting system, among other possible use cases.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of various aspects and embodiments described herein and many attendant advantages thereof will be readily obtained as the same becomes better understood by reference to the following detailed description when considered in connection with the accompanying drawings which are presented solely for illustration and not limitation, and in which:

FIG. 8A illustrates an exemplary proximity-based distributed bus that may be formed between two host devices to support D2D communication between the host devices, while

DETAILED DESCRIPTION

Figure 1A:
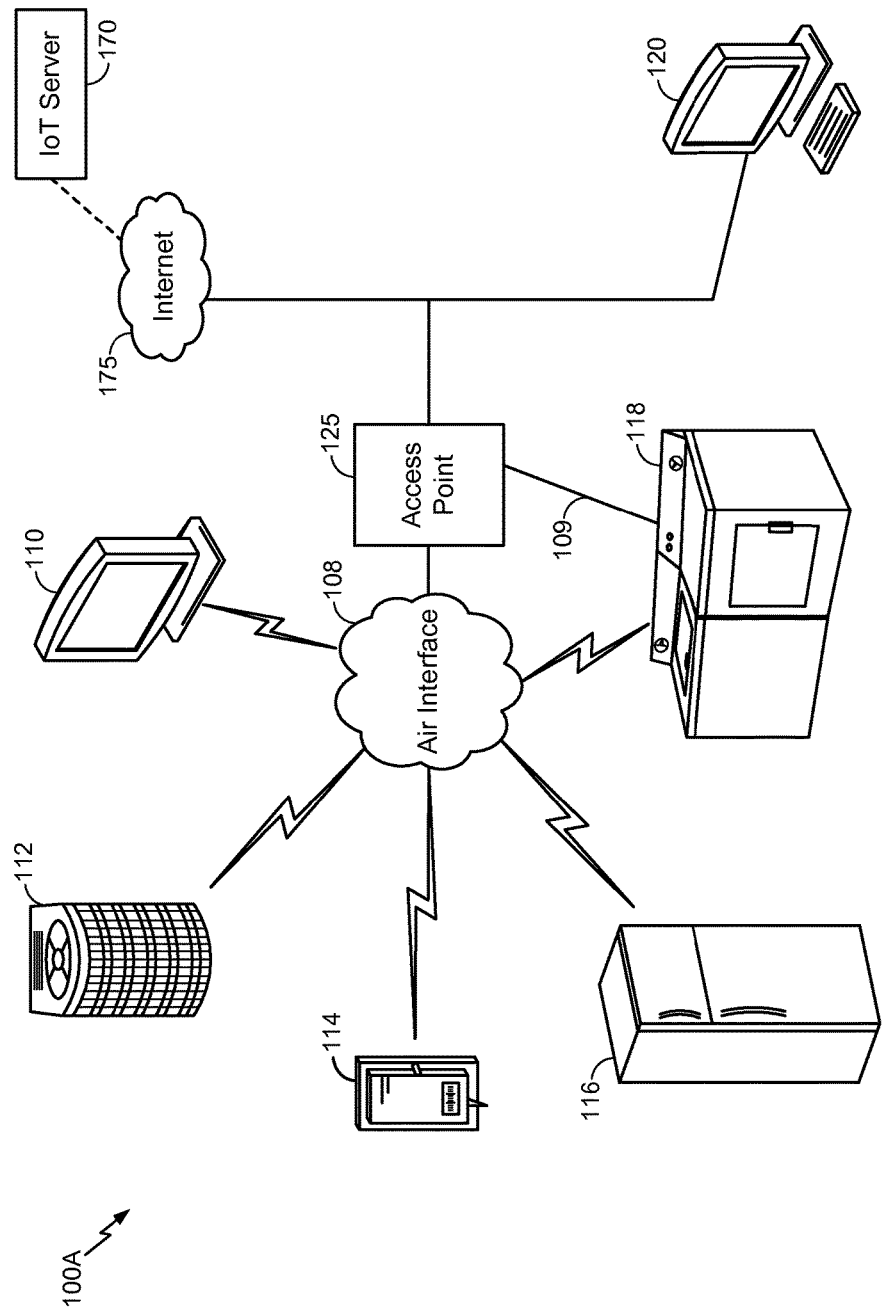
FIGS. 1A-1E illustrate exemplary high-level system architectures of wireless communications systems that may include various Internet of Things (IoT) devices, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with various aspects. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109 using appropriate device-to-device (D2D) communication technology. Alternatively, or additionally, some or all of the IoT devices 110-120 may be configured with a communication interface independent of the air interface 108 and the direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
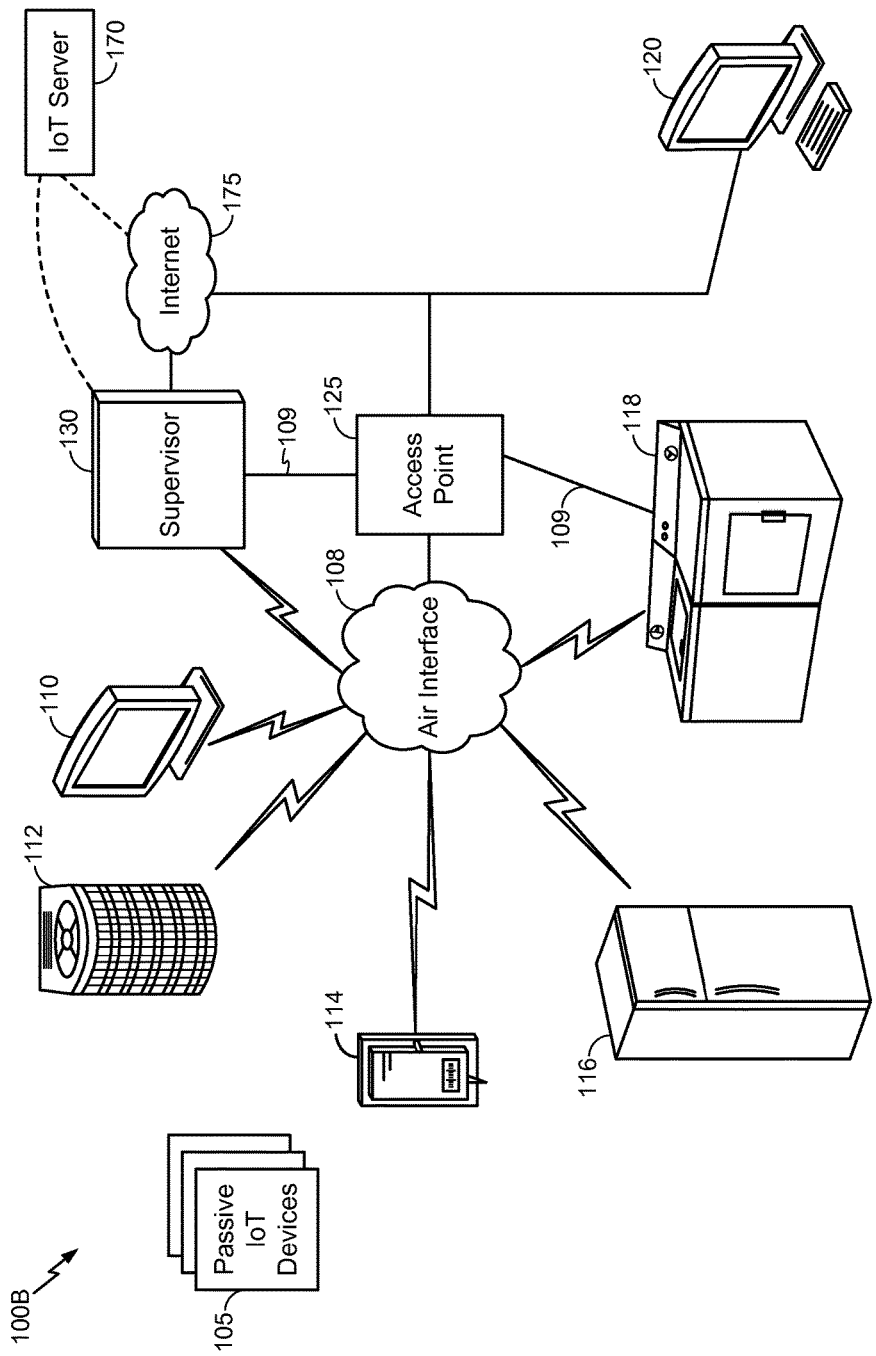

In accordance with various aspects, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In various embodiments, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide an identifier and attributes associated therewith to another device when queried over a short range interface. Active IoT devices may detect, store, communicate, act on, and/or the like, changes in attributes of passive IoT devices.

For example, the one or more passive IoT devices 105 may include a coffee cup passive IoT device 105 and an orange juice container passive IoT device 105 that each have an RFID tag or barcode. A cabinet IoT device (not shown) and the refrigerator IoT device 116 may each have an appropriate scanner or reader that can read the RFID tag or barcode to detect when the coffee cup passive IoT device 105 and/or the orange juice container passive IoT device 105 have been added or removed. In response to the cabinet IoT device detecting the removal of the coffee cup passive IoT device 105 and the refrigerator IoT device 116 detecting the removal of the orange juice container passive IoT device 105, the supervisor device 130 may receive one or more signals that relate to the activities detected at the cabinet IoT device and the refrigerator IoT device 116. The supervisor device 130 may then infer that a user is drinking orange juice from the coffee cup passive IoT device 105 and/or likes to drink orange juice from the coffee cup passive IoT device 105.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate an identity and one or more attributes associated therewith, become part of the wireless communications system 100B, and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
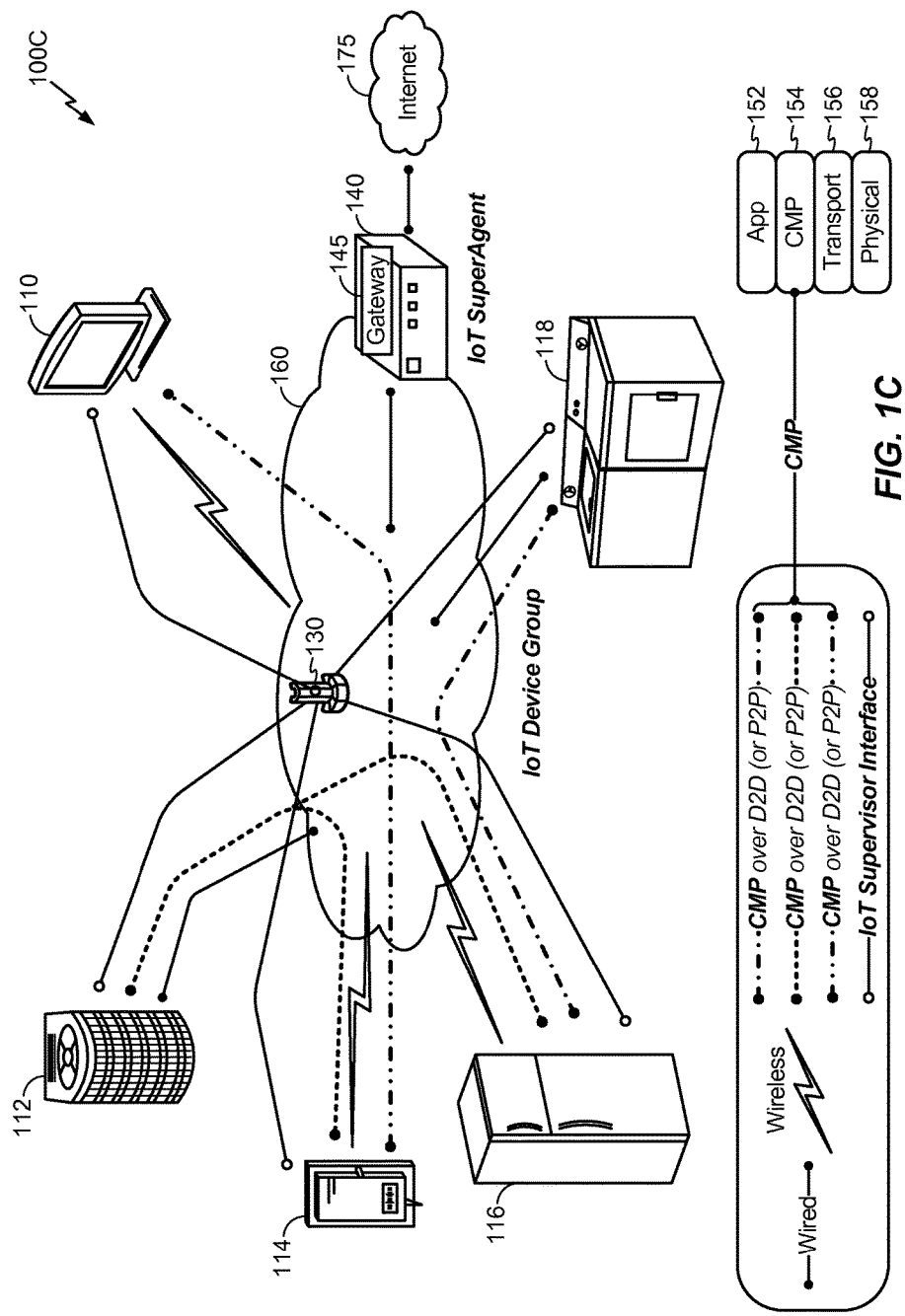

In accordance with various aspects, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The wireless communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT device group 160. The IoT device group 160 may comprise a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, the IoT device can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
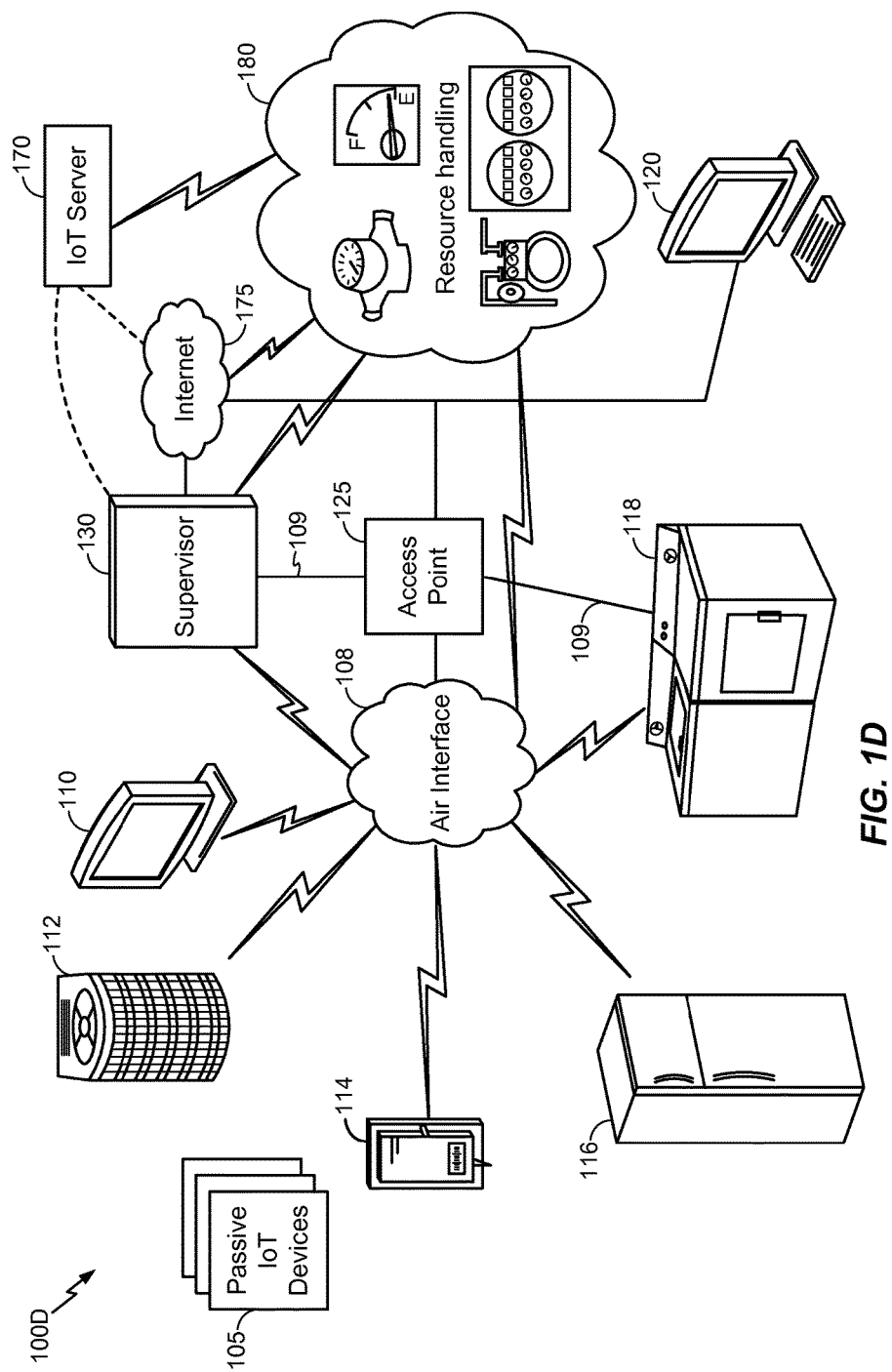

In accordance with various aspects, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-100C shown in FIGS. 1A-1C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-100C illustrated in FIGS. 1A-1C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate the resource, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
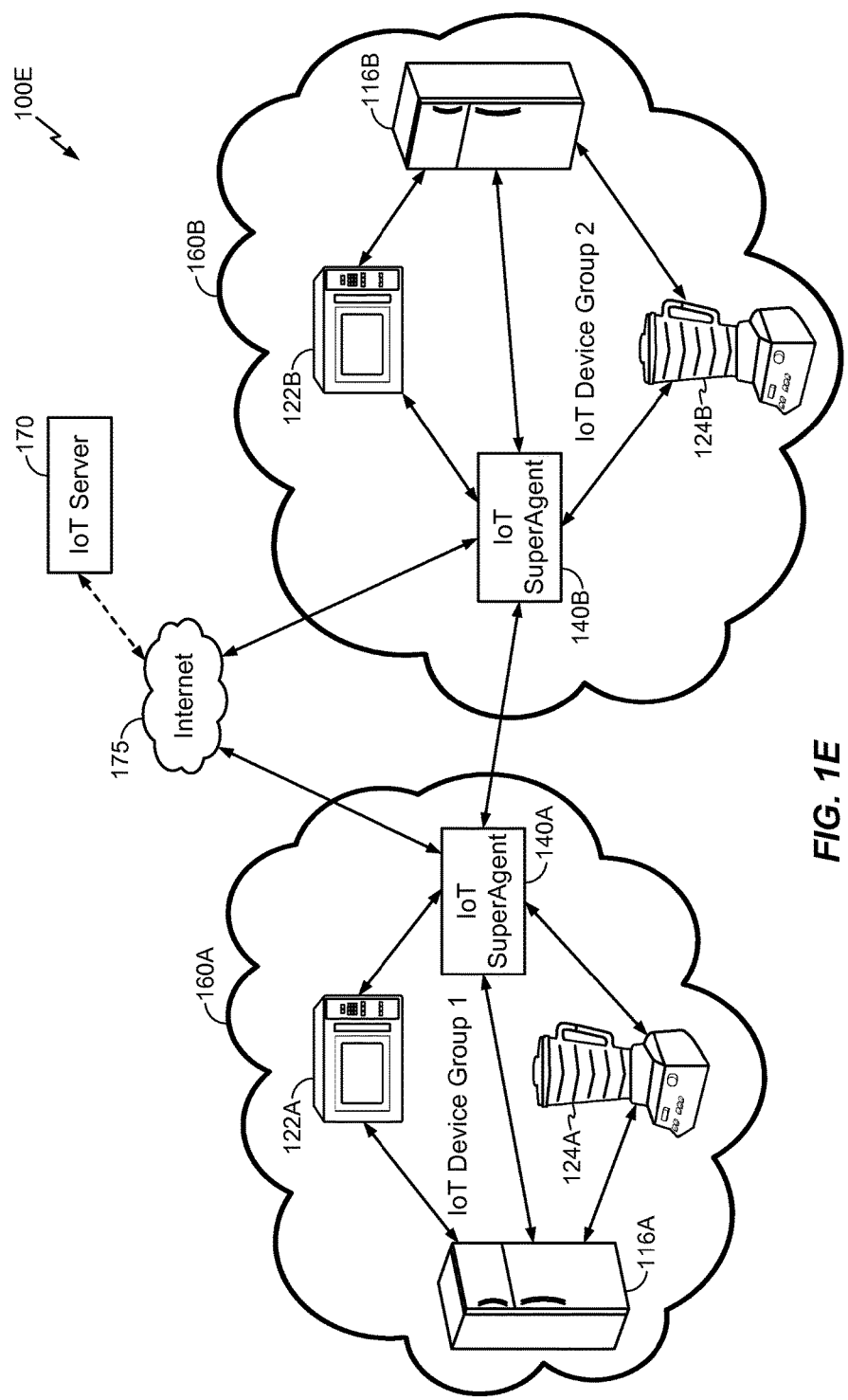

In accordance with various aspects, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-100D shown in FIGS. 1A-1D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-100D illustrated in FIGS. 1A-1D, respectively.

The wireless communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
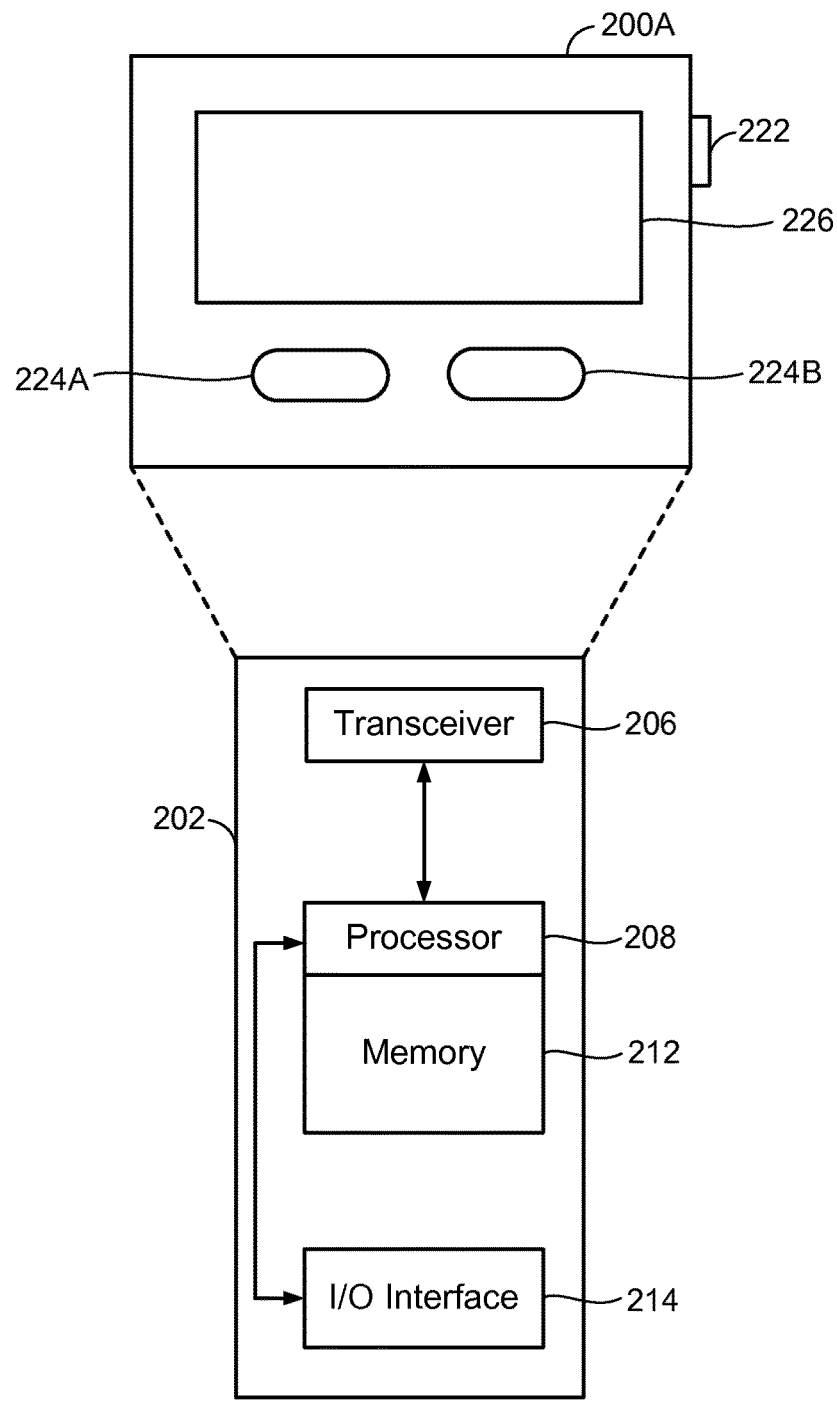
FIG. 2A illustrates an exemplary IoT device and FIG. 2B illustrates an exemplary passive IoT device, according to various aspects.

FIG. 2A illustrates a high-level example of an IoT device 200A in accordance with various aspects. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-1B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-1B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, various aspects can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the IoT device 200A is not limited to the illustrated features or arrangement shown in FIG. 2A.

Figure 2B:
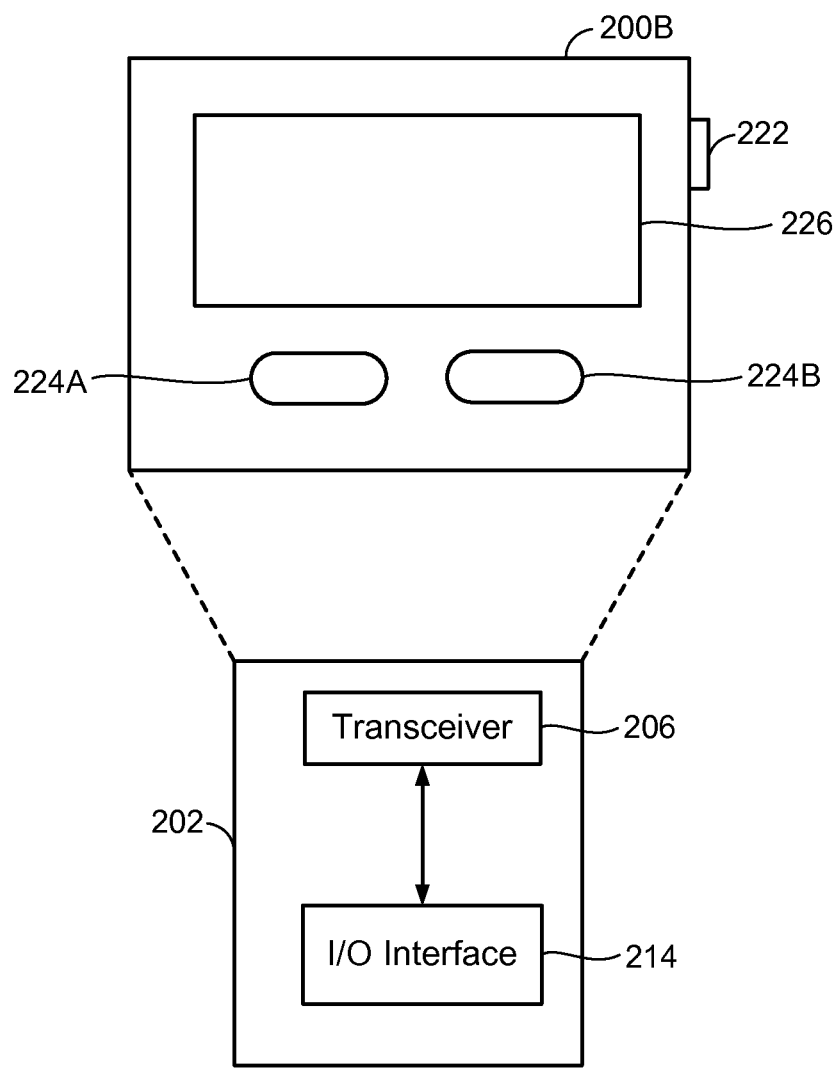

FIG. 2B illustrates a high-level example of a passive IoT device 200B in accordance with various aspects. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in various embodiments, the passive IoT device 200B may only include an I/O interface 214 or other suitable mechanism that allows the passive IoT device 200B to be observed, monitored, controlled, managed, or otherwise known within a controlled IoT network. For example, in various embodiments, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate an identity and one or more attributes associated therewith and be observed, monitored, controlled, or otherwise managed within a controlled IoT network.

Figure 3:
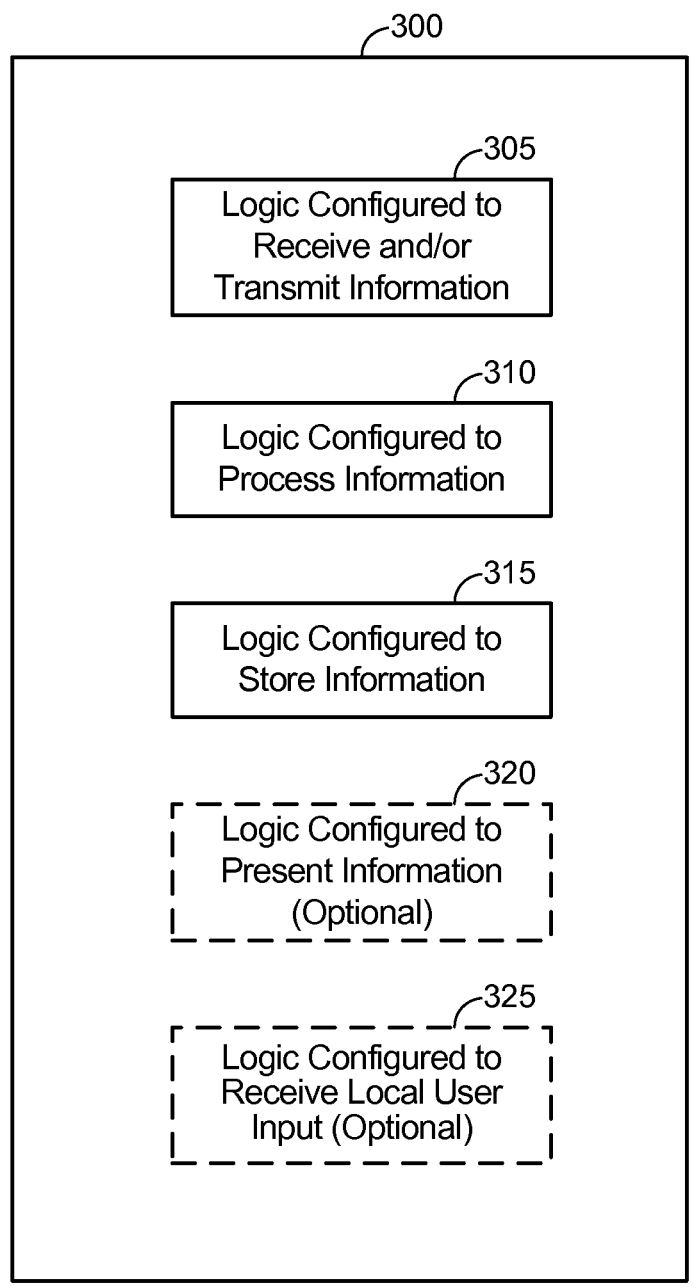
FIG. 3 illustrates a communication device that includes logic configured to perform functionality, according to various aspects.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-100B of FIGS. 1A-1B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the IoT server 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor a local environment associated therewith (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform reception and/or transmission function(s) associated therewith. However, the logic configured to receive and/or transmit information 305 does not correspond to software alone, and the logic configured to receive and/or transmit information 305 relies at least in part upon hardware to achieve the functionality associated therewith.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform the processing function(s) associated therewith. However, the logic configured to process information 310 does not correspond to software alone, and the logic configured to process information 310 relies at least in part upon hardware to achieve the functionality associated therewith.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform the storage function(s) associated therewith. However, the logic configured to store information 315 does not correspond to software alone, and the logic configured to store information 315 relies at least in part upon hardware to achieve the functionality associated therewith.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform the presentation function(s) associated therewith. However, the logic configured to present information 320 does not correspond to software alone, and the logic configured to present information 320 relies at least in part upon hardware to achieve the functionality associated therewith.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform the input reception function(s) associated therewith. However, the logic configured to receive local user input 325 does not correspond to software alone, and the logic configured to receive local user input 325 relies at least in part upon hardware to achieve the functionality associated therewith.

Referring to FIG. 3, while the configured logics of 305 through 325 are shown as separate or distinct blocks in FIG. 3, those skilled in the art will appreciate that the hardware and/or software by which the respective configured logic performs the functionality associated therewith can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs the functionality associated therewith (i.e., in this case, transmission of data) based in part upon the operation of hardware (i.e., the processor) associated with the logic configured to process information 310.

Generally, unless stated otherwise explicitly, the phrase "logic configured to" as used herein is intended to refer to logic at least partially implemented with hardware, and is not intended to map to software-only implementations that are independent of hardware. Also, those skilled in the art will appreciate that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
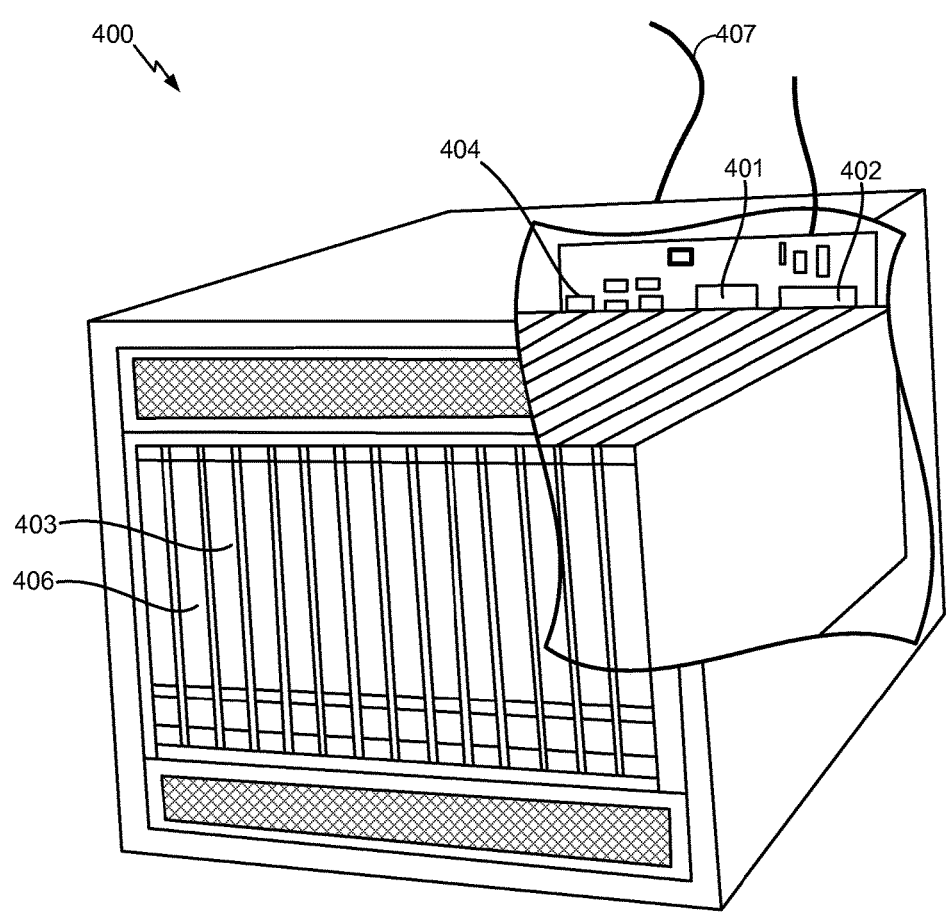
FIG. 4 illustrates an exemplary server, according to various aspects.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory 403 (e.g., a hard disk). The server 400 may also include a floppy disk drive, a compact disk (CD) drive, and/or a DVD disk drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, those skilled in the art will appreciate that the server 400 of FIG. 4 illustrates one example implementation of the communication device 300, whereby the logic configured to receive and/or transmit information 305 may correspond to the network access ports 404 used by the server 400 to communicate with the network 407, the logic configured to process information 310 may correspond to the processor 401, and the logic configuration to store information 315 may correspond to any combination of the volatile memory 402, the nonvolatile memory 403, and/or the floppy/CD/DVD disk drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

In general, as noted above, IP based technologies and services have become more mature, driving down the cost and increasing availability of IP, which has allowed Internet connectivity to be added to more and more types of everyday electronic objects. As such, the IoT is based on the idea that everyday electronic objects, not just computers and computer networks, can be readable, recognizable, locatable, addressable, and controllable via the Internet. In general, with the development and increasing prevalence of the IoT, numerous proximate heterogeneous IoT devices and other physical objects that have different types and perform different activities (e.g., lights, printers, refrigerators, air conditioners, etc.) may interact with one another in many different ways and be used in many different ways. As such, due to the potentially large number of heterogeneous IoT devices and other physical objects that may be in use within a controlled IoT network, well-defined and reliable communication interfaces are generally needed to connect the various heterogeneous IoT devices such that the various heterogeneous IoT devices can be appropriately configured, managed, and communicate with one another to exchange information, among other things. Accordingly, the following description provided in relation to FIGS. 5-8 generally outlines an exemplary communication framework that may support discoverable device-to-device (D2D) or peer-to-peer (P2P) services that can enable direct D2D communication among heterogeneous devices in a distributed programming environment as disclosed herein.

Figure 5:
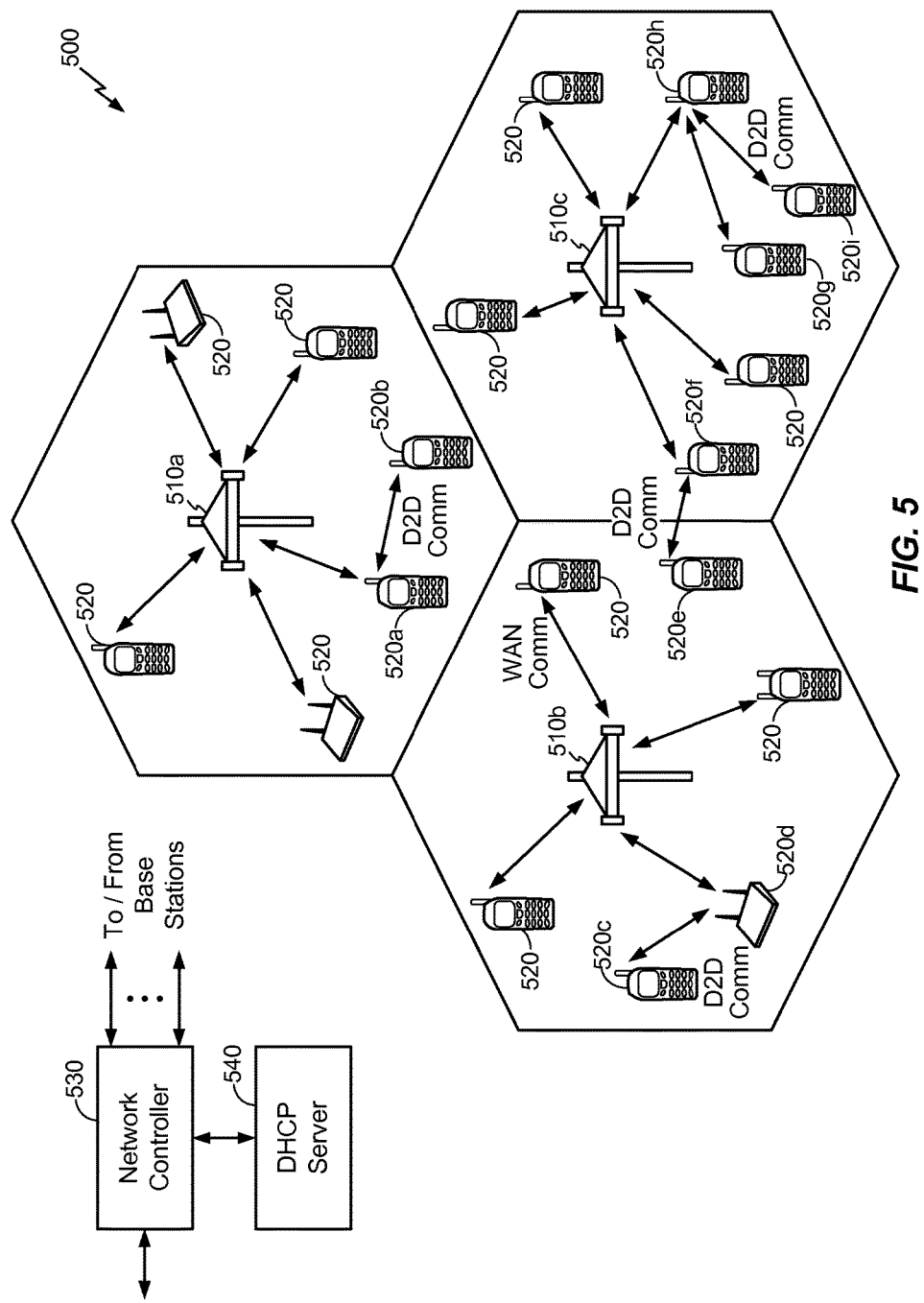
FIG. 5 illustrates a wireless communication network that may support discoverable device-to-device (D2D) (or peer-to-peer (P2P)) services that can enable direct D2D communication, according to various aspects.

In general, user equipment (UE) (e.g., telephones, tablet computers, laptop and desktop computers, vehicles, etc.), can be configured to connect with one another locally (e.g., Bluetooth, local Wi-Fi, etc.), remotely (e.g., via cellular networks, through the Internet, etc.), or according to suitable combinations thereof. Furthermore, certain UEs may also support proximity-based D2D communication using certain wireless networking technologies (e.g., Wi-Fi, Bluetooth, Wi-Fi Direct, etc.) that support one-to-one connections or simultaneously connections to a group that includes several devices directly communicating with one another. To that end, FIG. 5 illustrates an exemplary wireless communication network or WAN 500 that may support discoverable D2D services that can enable direct D2D communication, wherein the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another (e.g., directly or indirectly via wireless or wireline backhaul). DHCP server 540 may support D2D communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate directly.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 510 (e.g., when not engaged in D2D communication, or possibly concurrent with D2D communication).

In the description herein, WAN communication may refer to communication between a device 520 and a base station 510 in wireless network 500 (e.g., for a call with a remote entity such as another device 520). A WAN device is a device 520 that is interested or engaged in WAN communication. In general, the terms "peer-to-peer" or "P2P" communication and "device-to-device" or "D2D" communication as used herein refers to direct communication between two or more devices 520, without going through any base station 510. For simplicity, the description provided herein uses the term "device-to-device" or "D2D" to refer to such direct communication, although those skilled in the art will appreciate that the terms "peer-to-peer," "P2P," "device-to-device," and "D2D" may be interchangeable in the various aspects and embodiments described herein.

According to various embodiments, a D2D device is a device 520 that is interested or engaged in D2D communication (e.g., a device 520 that has traffic data for another device 520 within proximity of the D2D device). Two devices may be considered to be within proximity of one another, for example, if each device 520 can detect the other device 520. In general, a device 520 may communicate with another device 520 either directly for D2D communication or via at least one base station 510 for WAN communication.

In various embodiments, direct communication between D2D devices 520 may be organized into D2D groups. More particularly, a D2D group generally refers to a group of two or more devices 520 interested or engaged in D2D communication and a D2D link refers to a communication link for a D2D group. Furthermore, in various embodiments, a D2D group may include one device 520 designated a D2D group owner (or a D2D server) and one or more devices 520 designated D2D clients that are served by the D2D group owner. The D2D group owner may perform certain management functions such as exchanging signaling with a WAN, coordinating data transmission between the D2D group owner and D2D clients, etc. For example, as shown in FIG. 5, a first D2D group includes devices 520a and 520b under the coverage of base station 510a, a second D2D group includes devices 520c and 520d under the coverage of base station 510b, a third D2D group includes devices 520e and 520f under the coverage of different base stations 510b and 510c, and a fourth D2D group includes devices 520g, 520h and 520i under the coverage of base station 510c. Devices 520a, 520d, 520f, and 520h may be D2D group owners for their respective D2D groups and devices 520b, 520c, 520e, 520g, and 520i may be D2D clients in their respective D2D groups. The other devices 520 in FIG. 5 may be engaged in WAN communication.

In various embodiments, D2D communication may occur only within a D2D group and may further occur only between the D2D group owner and the D2D clients associated therewith. For example, if two D2D clients within the same D2D group (e.g., devices 520g and 520i) desire to exchange information, one of the D2D clients may send the information to the D2D group owner (e.g., device 520h) and the D2D group owner may then relay transmissions to the other D2D client. In various embodiments, a particular device 520 may belong to multiple D2D groups and may behave as either a D2D group owner or a D2D client in each D2D group. Furthermore, in various embodiments, a particular D2D client may belong to only one D2D group or belong to multiple D2D group and communicate with D2D devices 520 in any of the multiple D2D groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For D2D communication, the D2D downlink refers to the communication link from D2D group owners to D2D clients and the D2D uplink refers to the communication link from D2D clients to D2D group owners. In various embodiments, rather than using WAN technologies to communicate D2D, two or more devices may form smaller D2D groups and communicate D2D on a wireless local area network (WLAN) using technologies such as Wi-Fi, Bluetooth, or Wi-Fi Direct. For example, D2D communication using Wi-Fi, Bluetooth, Wi-Fi Direct, or other WLAN technologies may enable D2D communication between two or more mobile phones, game consoles, laptop computers, or other suitable communication entities.

Figure 6:
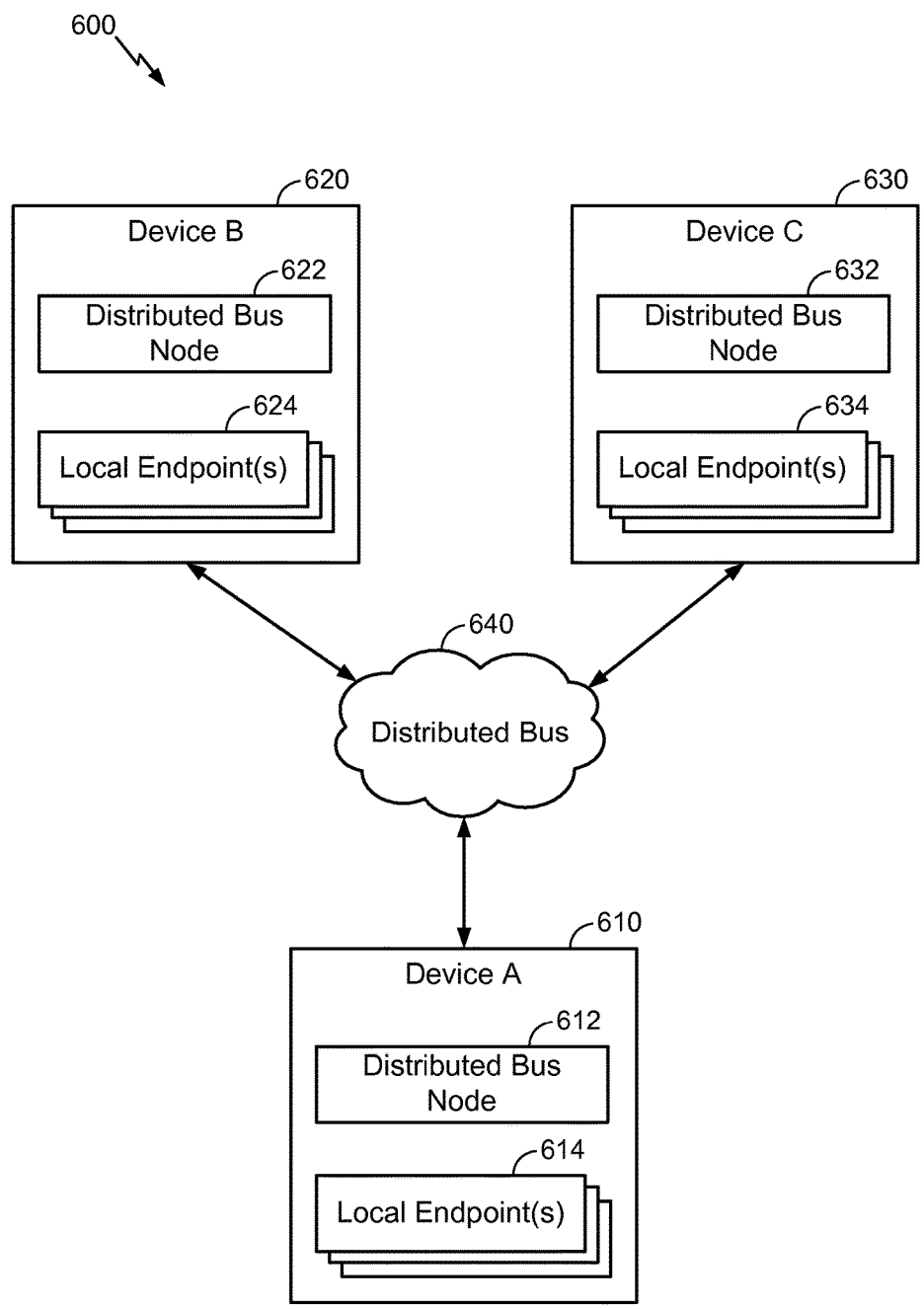
FIG. 6 illustrates an exemplary environment in which discoverable D2D services may be used to establish a proximity-based distributed bus over which various devices may communicate using D2D technology, according to various aspects.

According to various aspects, FIG. 6 illustrates an exemplary environment 600 in which discoverable D2D services may be used to establish a proximity-based distributed bus 640 over which various devices 610, 620, 630 may communicate using D2D technology. For example, in various embodiments, communications between applications and the like, on a single platform may be facilitated using an interprocess communication protocol (IPC) framework over the distributed bus 640, which may comprise a software bus used to enable application-to-application communications in a networked computing environment where applications register with the distributed bus 640 to offer services to other applications and other applications query the distributed bus 640 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 640 may handle message routing between the various devices 610, 620, 630 (e.g., via one or more bus routers or "daemons" or other suitable processes that may provide attachments to the distributed bus 640).

In various embodiments, the distributed bus 640 may be supported by a variety of transport protocols (e.g., Bluetooth, TCP/IP, Wi-Fi, CDMA, GPRS, UMTS, etc.). For example, according to various aspects, a first device 610 may include a distributed bus node 612 and one or more local endpoints 614, wherein the distributed bus node 612 may facilitate communications between local endpoints 614 associated with the first device 610 and local endpoints 624 and 634 associated with a second device 620 and a third device 630 through the distributed bus 640 (e.g., via distributed bus nodes 622 and 632 on the second device 620 and the third device 630). As will be described in further detail below with reference to FIG. 7, the distributed bus 640 may support symmetric multi-device network topologies and may provide a robust operation in the presence of device drops-outs. As such, the virtual distributed bus 640, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections among the first device 610, the second device 620, and the third device 630 without intervention when the various devices 610, 620, 630 come into range or proximity to each other.

Figure 7:
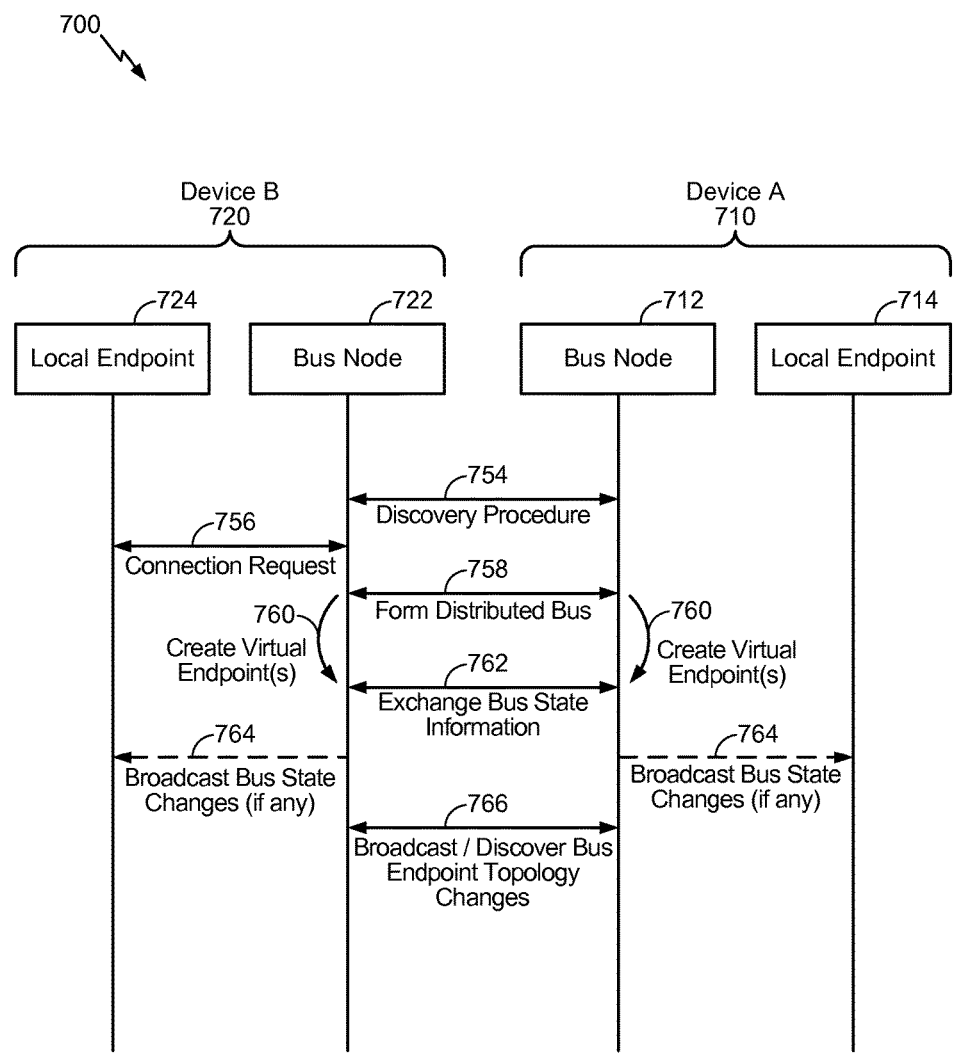
FIG. 7 illustrates an exemplary signaling flow in which discoverable D2D services may be used to establish a proximity-based distributed bus over which various devices may communicate using D2D technology, according to various aspects.

According to various aspects, FIG. 7 illustrates an exemplary signaling flow 700 in which discoverable D2D services may be used to establish a proximity-based distributed bus over which a first device ("Device A") 710 and a second device ("Device B") 720 may communicate using D2D technology. For example, in the signaling flow 700 shown in FIG. 7, Device A 710 may request to communicate with Device B 720, wherein Device A 710 may a include local endpoint 714 (e.g., a local application, service, etc.), which may make a request to communicate in addition to a bus node 712 that may assist in facilitating such communications. Further, Device B 720 may include a local endpoint 724 with which the local endpoint 714 may be attempting to communicate in addition to a bus node 722 that may assist in facilitating communications between the local endpoint 714 on the Device A 710 and the local endpoint 724 on Device B 720.

In various embodiments, the bus nodes 712 and 722 may perform a suitable discovery mechanism at 754. For example, mechanisms for discovering connections supported by Bluetooth, TCP/IP, UNIX, or the like may be used. At 756, the local endpoint 714 on Device A 710 may request to connect to an entity, service, endpoint etc., available through bus node 712. In various embodiments, the request may include a request-and-response process between local endpoint 714 and bus node 712. At 758, a distributed message bus may be formed to connect bus node 712 to bus node 722 and thereby establish a D2D connection between Device A 710 and Device B 720. In various embodiments, communications to form the distributed bus between the bus nodes 712 and 722 may be facilitated using a suitable proximity-based D2D protocol (e.g., the AllJoyn™ software framework designed to enable interoperability among connected products and software applications from different manufacturers to dynamically create proximal networks and facilitate proximal D2D communication). Alternatively, in various embodiments, a server (not shown) may facilitate the connection between the bus nodes 712 and 722. Furthermore, in various embodiments, a suitable authentication mechanism may be used prior to forming the connection between bus nodes 712 and 722 (e.g., SASL authentication in which a client may send an authentication command to initiate an authentication conversation). Still further, at 758, bus nodes 712 and 722 may exchange information about other available endpoints (e.g., local endpoints 634 on Device C 630 in FIG. 6). In such embodiments, each local endpoint that a bus node maintains may be advertised to other bus nodes, wherein the advertisement may include unique endpoint names, transport types, connection parameters, or other suitable information.

In various embodiments, at 760, bus node 712 and bus node 722 may use obtained information associated with the local endpoints 724 and 714, respectively, to create virtual endpoints that may represent the real obtained endpoints available through various bus nodes. In various embodiments, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 722). In various embodiments, virtual endpoints may receive messages from the local bus node 712 or 722, just like real endpoints, and may forward messages over the distributed bus. As such, the virtual endpoints may forward messages to the local bus nodes 712 and 722 from the endpoint multiplexed distributed bus connection. Furthermore, in various embodiments, virtual endpoints that correspond to virtual endpoints on a remote device may be reconnected at any time to accommodate desired topologies of specific transport types. In such embodiments, UNIX based virtual endpoints may be considered local and as such may not be considered candidates for reconnection. Further, TCP-based virtual endpoints may be optimized for one hop routing (e.g., each bus node 712 and 722 may be directly connected to each other). Still further, Bluetooth-based virtual endpoints may be optimized for a single pico-net (e.g., one master and n slaves) in which the Bluetooth-based master may be the same bus node as a local master node.

In various embodiments, the bus node 712 and the bus node 722 may exchange bus state information at 762 to merge bus instances and enable communication over the distributed bus. For example, in various embodiments, the bus state information may include a well-known to unique endpoint name mapping, matching rules, routing group, or other suitable information. In various embodiments, the state information may be communicated between the bus node 712 and the bus node 722 instances using an interface with local endpoints 714 and 724 communicating with using a distributed bus based local name. In another aspect, bus node 712 and bus node 722 may each may maintain a local bus controller responsible for providing feedback to the distributed bus, wherein the bus controller may translate global methods, arguments, signals, and other information into the standards associated with the distributed bus. The bus node 712 and the bus node 722 may communicate (e.g., broadcast) signals at 764 to inform the respective local endpoints 714 and 724 about any changes introduced during bus node connections, such as described above. In various embodiments, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 722 become disconnected may be indicated with name owner changed signals.

As used above, well-known names may be used to uniquely describe local endpoints 714 and 724. In various embodiments, when communications occur between Device A 710 and Device B 720, different well-known name types may be used. For example, a device local name may exist only on the bus node 712 associated with Device A 710 to which the bus node 712 directly attaches. In another example, a global name may exist on all known bus nodes 712 and 722, where only one owner of the name may exist on all bus segments. In other words, when the bus node 712 and bus node 722 are joined and any collisions occur, one of the owners may lose the global name. In still another example, a translated name may be used when a client is connected to other bus nodes associated with a virtual bus. In such embodiments, the translated name may include an appended end (e.g., a local endpoint 714 with well-known name "org.foo" connected to the distributed bus with Globally Unique Identifier "1234" may be seen as "G1234.org.foo").

In various embodiments, the bus node 712 and the bus node 722 may communicate (e.g., broadcast) signals at 766 to inform other bus nodes of changes to endpoint bus topologies. Thereafter, traffic from local endpoint 714 may move through virtual endpoints to reach intended local endpoint 724 on Device B 720. Further, in operation, communications between local endpoint 714 and local endpoint 724 may use routing groups. In various embodiments, routing groups may enable endpoints to receive signals, method calls, or other suitable information from a subset of endpoints. As such, a routing name may be determined by an application connected to a bus node 712 or 722. For example, a D2D application may use a unique, well-known routing group name built into the application. Further, bus nodes 712 and 722 may support registering and/or de-registering of local endpoints 714 and 724 with routing groups. In various embodiments, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 722 may send signals to notify other remote bus nodes or additions, removals, or other changes to routing group endpoints. In such embodiments, the bus node 712 or 722 may send a routing group change signal to other group members whenever a member is added and/or removed from the group. Further, the bus node 712 or 722 may send a routing group change signal to one or more endpoints that disconnect from the distributed bus without the one or more endpoints first removing themselves from the routing group.

Figure 8A:
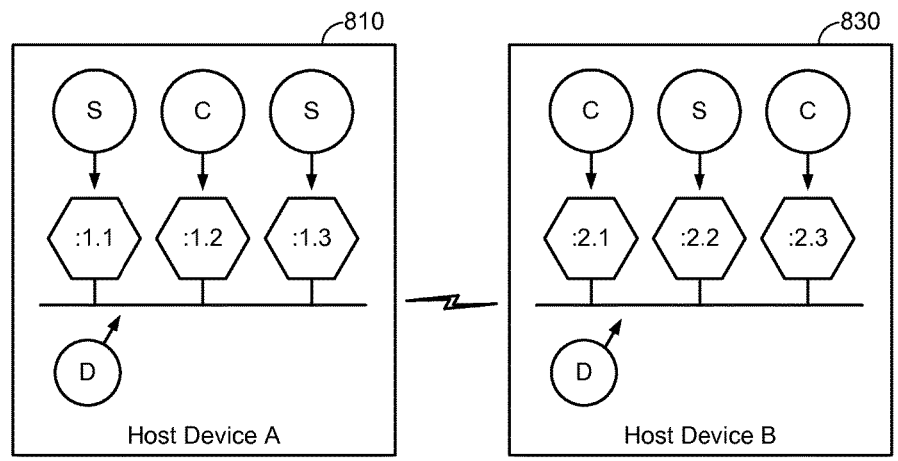

According to various aspects, FIG. 8A illustrates an exemplary proximity-based distributed bus that may be formed between a first host device 810 and a second host device 830 to enable D2D communication between the first host device 810 and the second host device 830. More particularly, as described above with respect to FIG. 6, the basic structure of the proximity-based distributed bus may comprise multiple bus segments that reside on separate physical host devices. Accordingly, in FIG. 8A, each segment of the proximity-based distributed bus may be located on one of the host devices 810, 830, wherein the host devices 810, 830 each execute a local bus router (or "daemon") that may implement the bus segments located on the respective host device 810, 830. For example, in FIG. 8A, each host device 810, 830 includes a bubble labeled "D" to represent the bus router that implements the bus segments located on the respective host device 810, 830. Furthermore, one or more of the host devices 810, 830 may have several bus attachments, where each bus attachment connects to the local bus router. For example, in FIG. 8A, the bus attachments on host devices 810, 830 are illustrated as hexagons that each correspond to either a service (S) or a client (C) that may request a service.

Figure 8B:
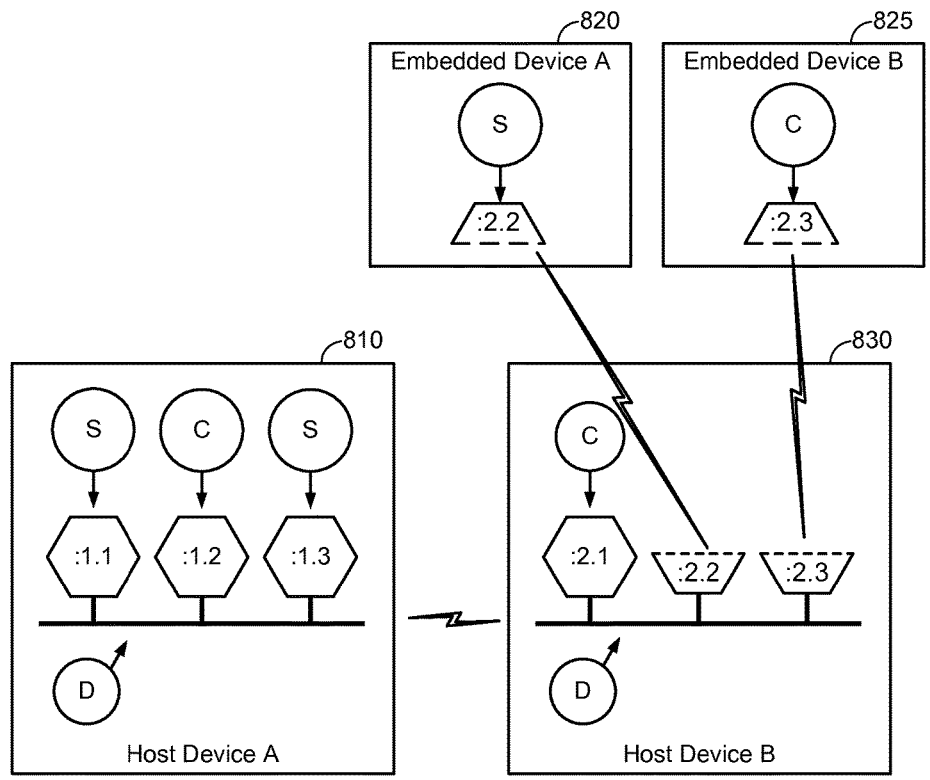
FIG. 8B illustrates an exemplary proximity-based distributed bus in which one or more embedded devices may connect to a host device to connect to the proximity-based distributed bus, according to various aspects.

However, in certain cases, embedded devices may lack sufficient resources to run a local bus router. Accordingly, FIG. 8B illustrates an exemplary proximity-based distributed bus in which one or more embedded devices 820, 825 can connect to a host device (e.g., host device 830) to connect to the proximity-based distributed bus and thereby engage in D2D communication (e.g., with the host device 830 or with other host devices 810 and/or embedded devices 825 that are attached to the proximity-based distributed bus via the host device 830). As such, the embedded devices 820, 825 may generally "borrow" the bus router running on the host device 830, whereby FIG. 8B shows an arrangement where the embedded devices 820, 825 are physically separate from the host device 830 running the borrowed bus router that manages the distributed bus segment on which the embedded devices 820, 825 reside. In general, the connection between the embedded devices 820, 825 and the host device 830 may be made according to the Transmission Control Protocol (TCP) and the network traffic flowing between the embedded devices 820, 825 and the host device 830 may comprise messages that implement bus methods, bus signals, and properties flowing over respective sessions in a similar manner to that described in further detail above with respect to FIGS. 6 and 7.

More particularly, the embedded devices 820, 825 may connect to the host device 830 according to a discovery and connection process that may be conceptually similar to the discovery and connection process between clients and services, wherein the host device 830 may advertise a well-known name (e.g., "org.alljoyn.BusNode") that signals an ability or willingness to host the embedded devices 820, 825. In one use case, the embedded devices 820, 825 may simply connect to the "first" host device that advertises the well-known name. However, if the embedded devices 820, 825 simply connect to the first host device that advertises the well-known name, the embedded devices 820, 825 may not have any knowledge about the type associated with the host device (e.g., whether the host device 830 is a mobile device, a set-top box, an access point, etc.), nor would the embedded devices 820, 825 have any knowledge about the load status on the host device. Accordingly, in other use cases, the embedded devices 820, 825 may adaptively connect to the host device 830 based on information that the host devices 810, 830 provide when advertising the ability or willingness to host other devices (e.g., embedded devices 820, 825), which may thereby join the proximity-based distributed bus according to properties associated with the host devices 810, 830 (e.g., type, load status, etc.) and/or requirements associated with the embedded devices 820, 825 (e.g., a ranking table that expresses a preference to connect to a host device from the same manufacturer).

According to various embodiments, the communication framework outlined above may be ideally suited to abstracting and simplifying processes to connect heterogeneous IoT devices and enable direct device-to-device (D2D) communication among the heterogeneous IoT devices. Accordingly, as will be described in further detail herein, an IoT connectivity module 900 may have an architecture that can further simplify connecting IoT devices (e.g., using the communication framework described above). For example, the IoT connectivity module 900 may generally comprise a hardware module that wraps or otherwise encapsulates functionality associated with one or more D2D communication frameworks (e.g., AllJoyn™, HomeKit, IoTivity, etc.), which can then be deployed to easily connect any existing non-connected "thing" that has a suitable processor and thereby make the non-connected thing a connected device.

Figure 9:
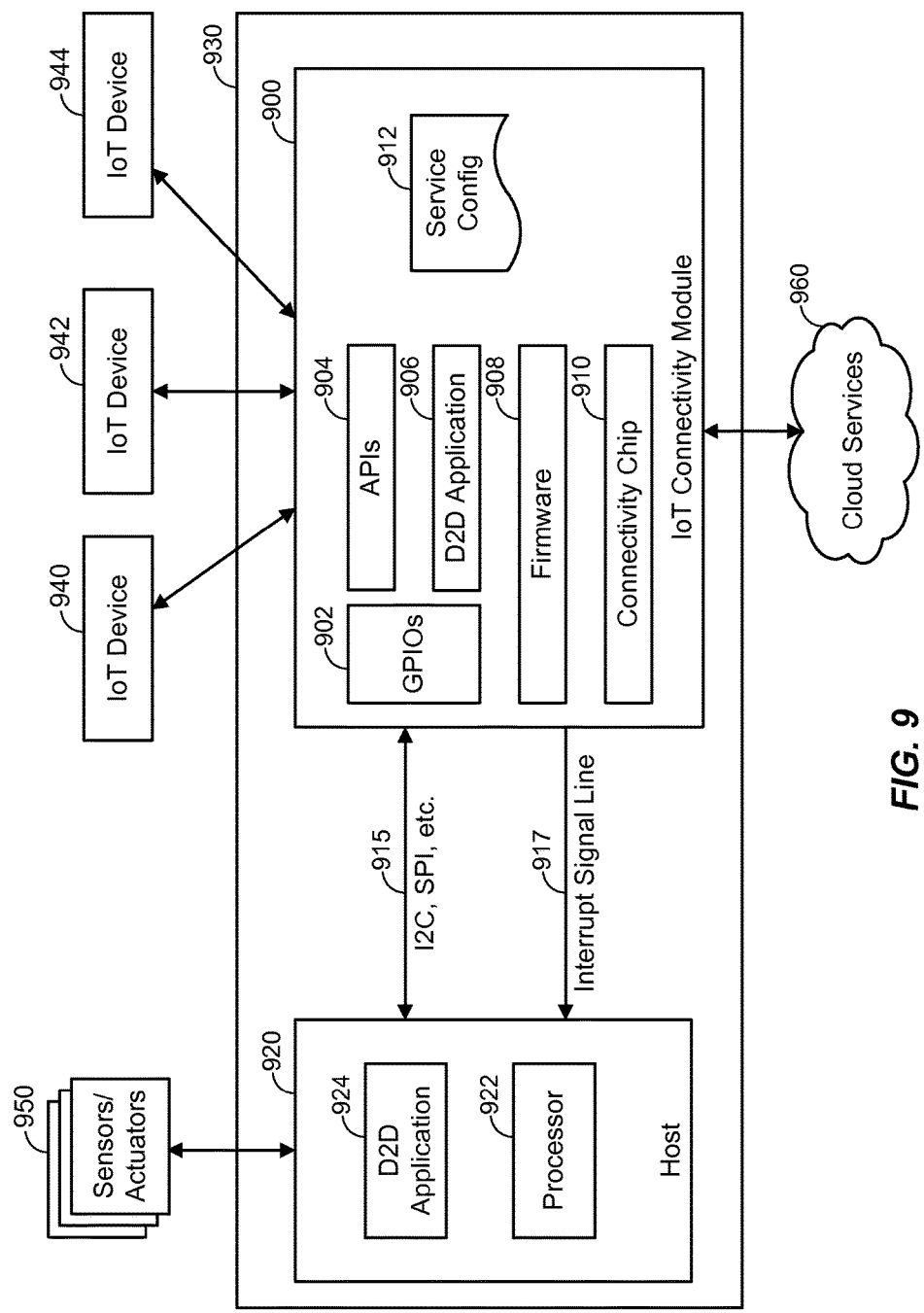
FIG. 9 illustrates an exemplary system architecture in which a connectivity module can add connectivity to a non-connected "thing" and thereby make the non-connected thing a connected IoT device, according to various aspects.

For example, referring to FIG. 9, assuming that a non-connected host 920 has a host processor 922 (usually a micro-controller unit (MCU)) that needs to be connected to other things (e.g., IoT devices 940, 942, 944, one or more cloud services 960, etc.), the host processor 922 may be connected to an IoT connectivity module 900 that may separate connectivity and processing associated with the host 920. More particularly, in various embodiments, the host processor 922 may connect to the IoT connectivity module 900 over a standard peripheral interface 915, which may comprise an Inter-Integrated Circuit ($I^2C$) interface, a Serial Peripheral Interface (SPI), a Universal Asynchronous Receiver and Transmitter (UART) interface, a High-Speed Inter-Chip (HSIC) interface, or another suitable standard interface 915 that the host processor 922 implements or otherwise supports. For example, assuming that the host processor 922 connects to the IoT connectivity module 900 over an I²C interface 915, the connectivity module 900 may appear like an I²C peripheral to the host processor 922. Furthermore, the IoT connectivity module 900 may implement a command protocol that implements various core services associated with a communication framework needed to connect the host processor 922 to other IoT devices 940, 942, 944, cloud services 960, etc., wherein the IoT connectivity module 900 may further handle appropriate low-level details to connect to the other IoT devices 940, 942, 944, the one or more cloud services 960, etc.

As such, in various embodiments, the IoT connectivity module 900 may expose the command protocol to the host processor 922 over the standard interface 915, whereby the host processor 922 can configure the command protocol to connect to the other IoT devices 940, 942, 944, etc. via the IoT connectivity module 900 (e.g., over a proximity-based distributed bus that the host processor 922 may create and manage autonomously) and further to connect to one or more cloud services 960 and/or other suitable network resources. For example, as shown in FIG. 9, the host 920 may generally comprise an interface to one or more sensors and/or actuators 950 (e.g., connections to motors, general-purpose input/output (GPIO) pins, or other suitable physical interfaces) and send commands associated with a D2D communication protocol to the IoT connectivity module 900 over the standard peripheral interface 915 in order to engage in D2D communication with other IoT devices 940, 942, 944, invoke cloud services 960, etc. Furthermore, in various embodiments, the host 920 may be coupled to the IoT connectivity module 900 via a dedicated interrupt signal line 917 that may be asserted to notify the host processor 922 that data to consume has become available (e.g., incoming data from IoT devices 940, 942, 944, cloud services 960, etc.).

More particularly, in various embodiments, the command protocol exposed over the standard interface 915 may include commands that allow the host processor 922 to setup interfaces and configurations, set and get one or more properties, send and receive notifications and other signals, trigger certain actions or events on certain notifications or events, call remote methods, get method details, and trigger certain actions or events on certain method calls and/or method replies, among other things. Accordingly, the host processor 922 may send one or more published commands associated with the D2D communication framework to the IoT connectivity module 900 over the standard peripheral interface 915, wherein the host 920 may comprise a D2D application 924 that can run developer code and contain an implementation or business logic corresponding to the D2D communication framework fully implemented in the IoT connectivity module 900. Furthermore, in various embodiments, the IoT connectivity module 900 may assert the dedicated interrupt signal line 917 to indicate to the host processor 922 that data has become available for consumption (e.g., command return values, received signals, control panel interactions, etc.).

As such, the standard peripheral interface 915 and the dedicated interrupt signal line 917 may allow the IoT connectivity module 900 and the host 920 to exchange data associated with a D2D communication protocol such that the IoT connectivity module 900 may provide a "buttoned-up" D2D connectivity solution to transform the host 920 and the IoT connectivity module 900 into an IoT device 930. For example, the IoT connectivity module 900 may be buttoned-up in the sense that developers may not have any need to install code on the IoT connectivity module 900, instead installing all developer code within the D2D application 924 that interacts with the IoT connectivity module 900 via the D2D communication protocol exposed over the standard peripheral interface 915, which may be implemented using a serialization or other suitable data exchange protocol (e.g., JavaScript Object Notation). On the IoT connectivity module 900 side, a D2D application 906 may comprise an embedded (or thin client) application that can bridge the D2D communication protocol to a D2D communication network (e.g., as described in further detail above with respect to FIG. 6-8). Accordingly, the host 920 and the IoT connectivity module 900 may be packaged into one device or module to make the IoT device 930 appear and operate just like any other IoT device. Furthermore, in various embodiments, the D2D application 906 may implement or extend support to different D2D communication frameworks to achieve interoperability with other IoT devices that may implement different D2D communication solutions.

Thus, in various embodiments, the IoT connectivity module 900 may support one or more generic interfaces, wherein the exposed command protocol may allow the host processor 922 to determine, enable, rename, and/or otherwise configure the generic interfaces supported on the IoT connectivity module 900 via the standard peripheral interface 915. In that context, the IoT connectivity module 900 may support different numbers of generic interfaces in different implementations, wherein an exemplary generic interface may have the following definition:

```
<interface name="org.allseen.AJM.generic1">
    <property name="prop1" type="q" access="readwrite" />
    <property name="bool1" type="b" access="read" />
    ...
</interface>
```

Accordingly, because most existing MCU-based designs already have standard interfaces, the IoT connectivity module 900 makes adding connectivity to existing designs very straightforward. Furthermore, the IoT connectivity module 900 may substantially reduce a support burden on a network because the host 920 may simply enter a SoftAP mode and be ready to onboard onto the network after connecting to power. Moreover, the IoT connectivity module 900 may abstract proximal connectivity and allow higher-level Internet protocols, in that network protocols that the IoT connectivity module 900 uses to support connectivity may be easily changed to support future-developed network protocols (e.g., Wi-Fi may be replaced with Bluetooth Low Energy, 802.11ah, etc.). As such, in certain embodiments, the IoT connectivity module 900 may provide a highly integrated hostless solution, wherein the IoT connectivity module 900 may comprise a user space (not shown) where the D2D application 924 can be implemented such that the IoT connectivity module 900 can provide a complete IoT platform in a single module (e.g., the peripheral interface 915 and dedicated interrupt signal line 917 used to interconnect the host 920 and the IoT connectivity module 900 may comprise an in-chip virtual interconnect). However, as shown in FIG. 9, the IoT connectivity module 900 provides a hosted solution in which the peripheral interface 915 and dedicated interrupt signal line 917 comprise a physical interconnect.

In various embodiments, the IoT connectivity module 900 may include a connectivity chip 910 that implements a wireless network platform (e.g., the QCA4002/4004 chipon-board solution developed by QUALCOMM®). For example, in various embodiments, the wireless network platform implemented on the connectivity chip 910 may comprise one or more host interfaces to connect to one or more local system controllers, one or more antennas, an integrated radio frequency (RF) front end and network stack, one or more wireless radios (e.g., a WLAN radio, a Bluetooth radio, etc.), and/or other suitable components that can be used to add network connectivity to an IoT device. In addition, the IoT connectivity module 900 may expose various application program interfaces (APIs) 904 that allow digital devices with existing MCU/processor designs access to services via SPI, I$^2$C, UART, and/or other standard interfaces, wherein the IoT connectivity module 900 may pass through all lower-level commands that the APIs 904 support. In addition, the D2D application 906 may implement various core services and handles the appropriate low-level connectivity details associated with the connectivity communication framework (e.g., services that relate to notifications, control panels, onboarding, configuration, lighting, software updates, events, actions, etc.). Moreover, in various embodiments, a manufacturer may have the ability to define a service configuration 912 (e.g., a device name, service enablement, input/output mapping to services, etc.) and have firmware 908 that implements an embedded JavaScript module that can bind the service frameworks implemented in the D2D application 906. For example, in various embodiments, the firmware 908 may support various MCU architectures, memory architectures, sensor architectures, and other general-purpose input/output (GPIO) pins 902 and the firmware 908 may further be updated in a simple manner (e.g., a Joint Test Action Group (JTAG) testing interface may not be needed to load the firmware 908 and the firmware 908 may not require over-the-air (OTA) updates).

In various embodiments, one or several different approaches may be used to define the interfaces that are used to add network connectivity and the ability to support D2D communication to the host 920. For example, a first approach may comprise runtime interface definition, wherein the host 920 may send the interface definition to the IoT connectivity module 900 over the peripheral interface (e.g., using JavaScript Object Notation (JSON), XML, or another suitable data interchange protocol). In response to receiving the interface definition from the host 920, the IoT connectivity module 900 may implement and advertise the defined interface(s) over a proximal network (e.g., via a proximity-based distributed bus). Furthermore, the host 920 may subsequently delete, update, add, or otherwise modify the interface definitions in the runtime approach via sending specific commands associated with the exposed D2D communication framework to the IoT connectivity module 900. In a second approach, reconfigurable interfaces may be used, wherein the IoT connectivity module 900 may be manufactured with various preconfigured D2D communication interfaces that can be subsequently upgraded via updates to the firmware 908 and/or incorporated into new versions at manufacture-time. In embodiments that use reconfigurable interfaces, the host 920 may send a GetSupportedInterfaces command to the IoT connectivity module 900 over the peripheral interface 915, and the IoT connectivity module 900 may then return the preconfigured interfaces supported on the IoT connectivity module 900 to the host 920. Furthermore, the host 920 may send a SetEnabledInterfaces command to the IoT connectivity module 900 to enable specific interfaces, send a DefineInterfaceName command to the IoT connectivity module 900 to rename specific interfaces (e.g., to make a specific interface from a generic interface), and so on. In still another approach, abstracted interfaces may be used, wherein the IoT connectivity module 900 may be manufactured with one or more well-known services expressed as a collection of one or more interfaces, which may similarly be upgraded via updates to the firmware 908 and/or incorporated into new versions at manufacture-time. However, the abstracted interface approach may differ in that protocols and services are abstracted from the host processor 922. For example, the service configuration framework 912 may be used to define one or more device properties (e.g., a device name) according to a certain D2D communication framework and the interface to the host processor 922 may expose a method to set and retrieve the device properties in a manner that does not adhere to the D2D communication framework that the service configuration framework 912 uses to define the properties (e.g., to allow the host processor 922 to implement other interfaces that may be more familiar or compatible with other products). Accordingly, the same IoT connectivity module 900 could be updated to support other protocols without impacting the data exchange protocol that the host 920 uses to communicate with the IoT connectivity module 900 over peripheral interface 915 and interrupt signal line 917.

Accordingly, the IoT connectivity module 900 described above may provide a turn-key solution that can add network connectivity and the ability to support D2D communication to the non-connected host 920 and thereby make the non-connected host 920 into an IoT device 930 that can discover, connect, and directly communicate with other IoT devices 940, 942, 944, cloud services 960, or utilize other network services.

Figure 10:
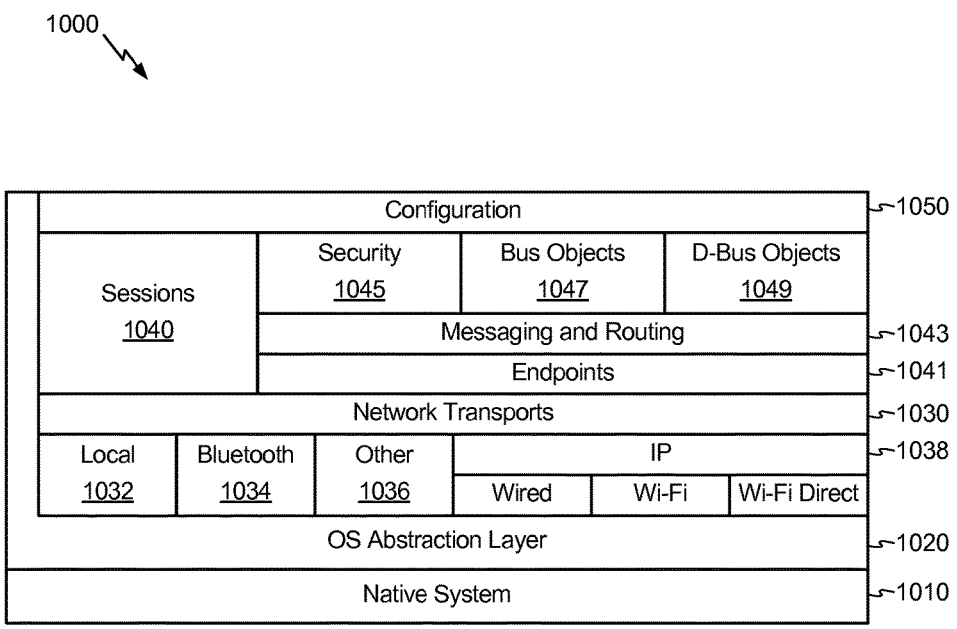
FIG. 10 illustrates an exemplary architecture associated with a proximal D2D communication framework that the IoT connectivity module may implement to add connectivity to an otherwise non-connected host, according to various aspects.

For example, according to various aspects, FIG. 10 illustrates an exemplary architecture 1000 associated with a proximal D2D communication framework that the IoT connectivity module 900 described above may implement to add connectivity to an otherwise non-connected host. More particularly, as described above with respect to FIG. 6-8, the proximal D2D communication framework may be used to establish a proximity-based distributed bus that includes multiple bus segments that reside on separate physical host devices, wherein each host device may execute a local bus router to implement a local segment on the proximity-based distributed bus. Furthermore, any particular host device that implements the architecture 1000 shown in FIG. 10 to provide a local segment on the proximity-based distributed bus may have one or more bus attachments that connect to the local bus router (e.g., one or more services, one or more clients that may request a service, etc.). Accordingly, the IoT connectivity module may implement the architecture 1000 shown in FIG. 10 in order to host a local bus segment and the non-connected host may essentially correspond to a bus attachment on the local bus segment such that the host can engage in D2D (or P2P) communications with other endpoints attached to the proximity-based distributed bus. As such, the local bus router may generally correspond to an application that runs in the background to monitor the proximity-based distributed bus, detect one or more interesting events communicated over the proximity-based distributed bus, and respond to the one or more events as appropriate. Because these events are usually external (e.g., originating from another node on the proximity-based distributed bus), the following description will discuss the various components in the architecture 1000 from a bottom-up perspective.

In particular, the architecture 1000 may include a native system 1010 at the lowest level, wherein an operating system abstraction layer 1020 may reside above the native system 1010. The operating system abstraction layer 1020 may provide common abstractions for routers running on various different operating systems, which may include Linux operating systems, Windows operating systems, Android operating systems, etc. The architecture 1000 may further include various low-level networking components running on the operating system abstraction layer 1020, as clients, services, and peers that connect to the proximity-based distributed bus generally use local interprocess communication mechanisms to communicate with the bus router, whereby the router has the responsibility to deal with the various available transport mechanisms on a given platform. In particular, as shown in FIG. 10, the low-level networking components may include a "local" transport mechanism 1032, which may correspond to the sole connection to the clients, services, and peers running on a particular hosted bus segment. For example, according to various aspects, a Bluetooth transport mechanism 1034 may handle complexities associated with creating and managing piconets in a Bluetooth system. Additionally, the Bluetooth transport mechanism 1034 may provide one or more service advertisement and discovery functions appropriate to Bluetooth in addition to ensuring reliable communications. As such, the local transport mechanism 1032, the Bluetooth transport mechanism 1034, and/or other transport mechanisms 1036 may be provided above the operating system abstraction layer 1020 alongside an Internet Protocol (IP) transport mechanism 1038. Furthermore, as shown in FIG. 10, wired, Wi-Fi, and Wi-Fi Direct transport mechanisms may be grouped under the IP transport mechanism 1038 because each uses the underlying TCP/IP network stack. In certain use cases, there may be differences with respect to how service advertisement and discovery may be accomplished because such functionality is outside the scope of the TCP/IP standard. As such, the IP transport mechanism 1038 may include one or more modules to implement the service advertisement and discovery functionality.

According to various embodiments, the various technology-specific transport implementations mentioned above may be collected into a network transports abstraction 1030 such that there may essentially be no difference between a Wi-Fi connection, a non-Wi-Fi (e.g., Bluetooth) connection, a wired Ethernet connection, etc. According to various aspects, a sessions module 1040 may reside over the network transports abstraction 1030, wherein the sessions module 1040 may handle procedures to establish and maintain communication connections to make one or more routers and one or more applications associated with the proximal D2D communication framework appear to be a unified software bus. In that sense, the architecture 1000 may include an endpoints layer 1041 to provide connections to one or more local clients, services, and/or peers and extend the use associated with the endpoint objects to bus-to-bus connections representing the transports that the bus router uses to send messages across the proximity-based distributed bus.

In addition to the routing functions that the bus-to-bus connections imply, the router architecture 1000 may include endpoints 1041 corresponding to one or more bus objects 1047 used to manage or otherwise one or more distributed bus objects 1049 that correspond to the local bus segment implemented via the router architecture 1000. As such, a messaging and routing layer 1043 may reside between the endpoints layer 1041 and the bus objects 1047, 1049, wherein the messaging and routing layer 1043 may provide functionality to marshal and unmarshal parameters and return values into messages that are sent across the proximity-based distributed bus. The messaging and routing layer 1043 may further arrange to deliver inbound messages to the appropriate bus objects and proxies (e.g., via asserting a dedicated physical interrupt line coupled between a host and an IoT connectivity module that implements the architecture 1000 via), and messaging and routing layer 1043 may further arrange to send messages destined to be delivered to other bus attachments on the proximity-based distributed bus. As such, the messaging and routing layer 1043 may communicate with the endpoints layer 1041, wherein the proximal D2D communication framework may move data from one endpoint to another at the lower levels. For example, when a particular service requests to advertise a well-known bus name, the request may be translated into a remote method call directed to a bus object 1047, 1049 implemented on the router. As with a service, the router may have various bus objects 1047, 1049 associated with corresponding object paths that implement specific named interfaces. The low-level mechanism to control communication over the proximity-based distributed bus may involve sending remote method invocations to such router bus objects 1047, 1049.

According to various aspects, at the top level, the architecture 1000 shown in FIG. 10 may include a configuration subsystem 1050 that controls the overall operation associated with the bus router, which may allow a system administrator, an OEM, a user, or another suitable entity to specify certain permissions and provide the ability to arrange on-demand services creation. Additionally, the configuration subsystem 1050 may be used to define one or more parameters to limit resources that the bus router can consume (e.g., limiting TCP connections that are active at any given time to a particular maximum), prevent and/or mitigate the effects from denial-of-service (DoS) attacks (e.g., limiting the connections that are currently authenticating), etc. Furthermore, a security module 1045 may allow applications to authenticate each other and send encrypted data to thereby provide end-to-end application level security. In particular, authentication and data encryption may be implemented at the applications, which can reside on the same device or on different devices, and can be attached to the same bus router or different bus routers. Accordingly, an application can tag an interface as 'secure' to initiate an authentication-related and encryption-related key exchange on-demand when a consumer application invokes a method call on a secure interface and/or explicitly invokes an API to secure the connection with a remote peer application. As such, the security module 1045 may store authentication and encryption keys in a key store and assist with authentication and encryption procedures through a listener callback function used to authentication credentials (e.g., a PIN or password) and/or verify authentication credentials (e.g., verifying a certificate chain).

Figure 11:
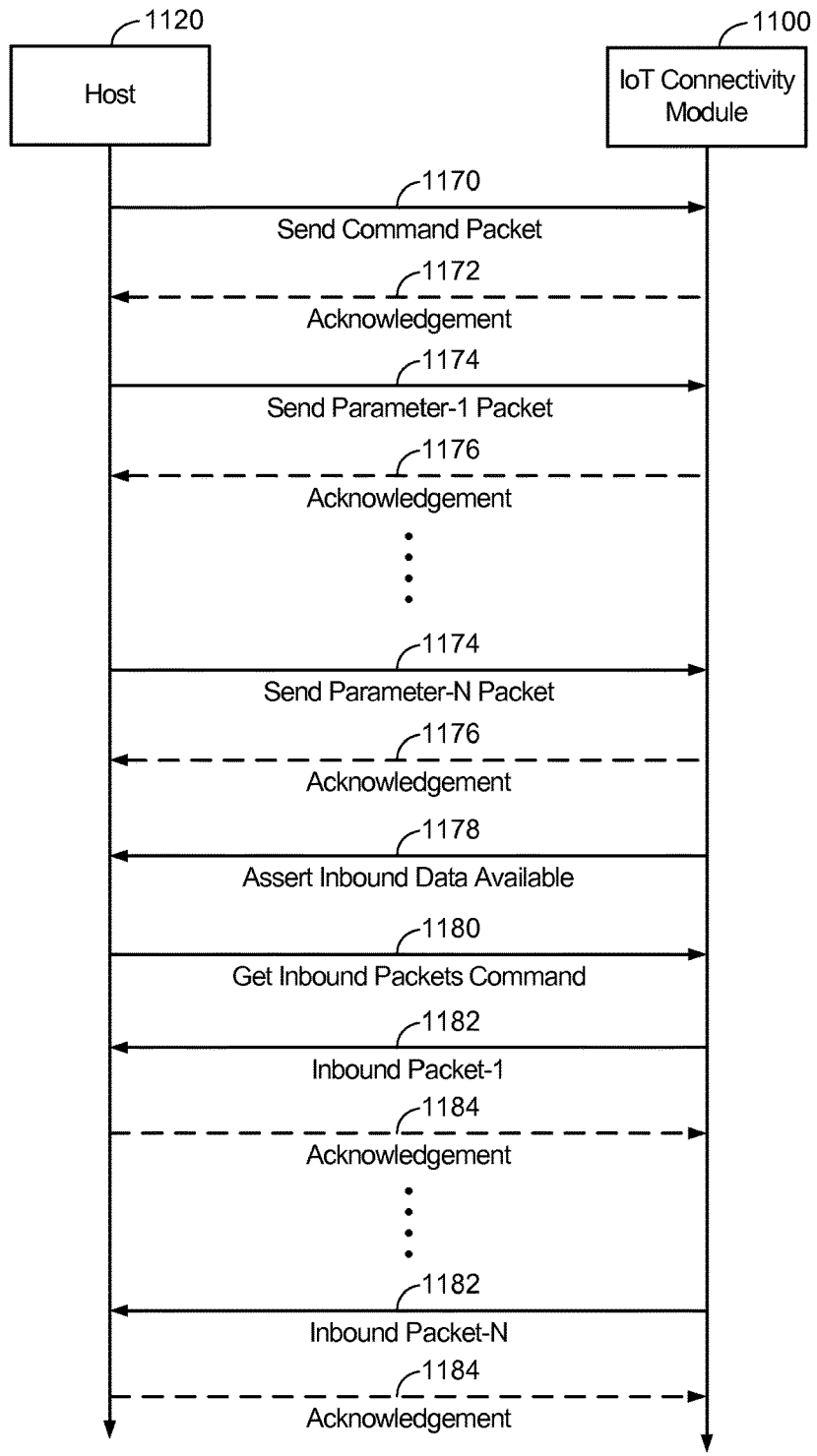
FIG. 11 illustrates an exemplary signaling flow between a host and an IoT connectivity module used to add connectivity to the host, according to various aspects.
Figure 12:
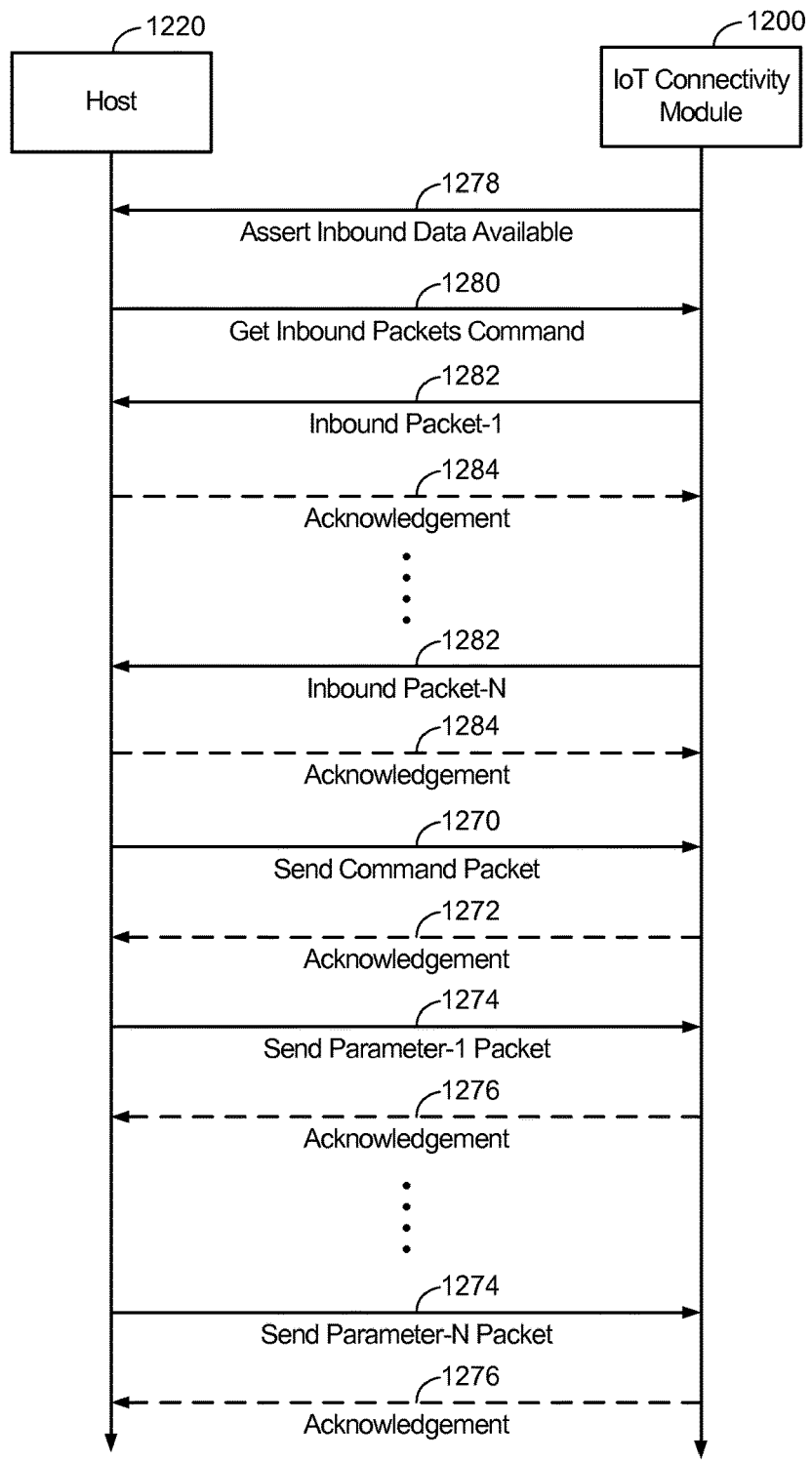
FIG. 12 illustrates another exemplary signaling flow between a host and an IoT connectivity module used to add connectivity to the host, according to various aspects.

According to various aspects, FIG. 11-12 illustrate exemplary signaling flows between a host 1120, 1220 having an appropriate processor or microcontroller unit (MCU) and an IoT connectivity module 1100, 1200 that may implement the features described in further detail above. In general, the signaling flows shown in FIG. 11-12 may operate in accordance with a command protocol that the IoT connectivity module 1100, 1200 exposes and sends to the host 1120, 1220 over a standard interface. For example, according to various aspects, the command protocol may define a packet structure for commands and parameters as shown below in Table 1 and further define a byte structure for a command byte as shown in below in Table 2.

TABLE 1

Command/Parameter Packet Structure

| Byte 0 | Byte 1 | Bytes 2-3 | Byte 4 | ... | Byte N-2 | Byte 2 | Bytes 1-0 |
|---|---|---|---|---|---|---|---|
| Protocol Version | Command | Parameter Length (Bytes) | Parameter 1 | | | Command Reference Number | Checksum |

TABLE 2

Command Byte Structure

| Bit 7 | Bit 6 | Bit 5 | Bit 4 | Bit 3 | Bit 2 | Bit 1 | Bit 0 |
|---|---|---|---|---|---|---|---|
| CmdExt | Done | Command or Parameter Number | | | | | |

Accordingly, each command and parameter sent between the host 1120, 1220 and the IoT connectivity module 1100, 1200 may comprise a packet having the structure defined above in Table 1, and the command byte in the packets sent between the host 1120, 1220 and the IoT connectivity module 1100, 1200 may be structured as shown above in Table 2. In that context, the CmdExt bit may be used when the command has more than one parameter to be sent immediately after the command byte. Accordingly, when the CmdExt bit is set, bits 5 . . . 0 may specify the parameter number for the current command, and the Done bit may be set if the current packet is the last command packet. As such, if the command only has one packet, the Done bit will generally be set in that packet. Furthermore, in Table 1, the command reference number may comprise a reference identifier that the host 1120, 1220 assigns to track values returned from the IoT connectivity module 1100, 1200, wherein the command reference number may be set to zero if the host 1120, 1220 does not care about tracking out-of-order return values, in which case the host 1120, 1220 may wait for a response from every command before issuing the next command. Furthermore, although all data that the IoT connectivity module 1100, 1200 sends to the host 1120, 1220 travels over the same standard interface, the host 1120, 1220 may always be the master and request data to be sent from the IoT connectivity module 1100, 1200. Accordingly, in the event that the IoT connectivity module 1100, 1200 has data to send to the host 1120, 1220 asynchronously (e.g., incoming signals, events, notifications, control panel interactions, etc.), the IoT connectivity module 1100, 1200 may assert a separate interrupt signal line to notify the host 1120, 1220 about the pending data.

Furthermore, according to various aspects, the command protocol that the IoT connectivity module 1100, 1200 exposes and sends to the host 1120, 1220 may define a packet structure for data that the IoT connectivity module 1100, 1200 returns to the host 1120, 1220 as shown below in Tables 3-7, wherein the IoT connectivity module 1100, 1200 may generally ensure that all return packets for a command are sent as one contiguous unit (i.e., without interleaving packets from multiple commands).

TABLE 3

Return Packet Structure

| Byte 0 | Byte 1 | Byte 2 | Bytes 2-3 | Byte 4 | ... | Byte N-2 | Bytes 1-0 |
|---|---|---|---|---|---|---|---|
| Status | Command Reference Number | Type | Data Length (Bytes) | Data | | | Checksum |

TABLE 4

Status Byte Structure

| Bit 7 | Bit 6 | Bit 5 | Bit 4 | Bit 3 | Bit 2 | Bit 1 | Bit 0 |
|---|---|---|---|---|---|---|---|
| Reserved | Reserved | Reserved | Reserved | CmdDone | Error Code | | |

TABLE 5

Type Byte Structure

| Bit 7 | Bit 6 | Bit 5 | Bit 4 | Bit 3 | Bit 2 | Bit 1 | Bit 0 |
|---|---|---|---|---|---|---|---|
| Data Type (optional) | | | | Inbound Type | | | |

TABLE 6

Data Type Values

| Data Type | Value |
|---|---|
| 8-bit Unsigned Integer | 0 |
| 8-bit Signed Integer | 1 |
| 16-bit Unsigned Integer | 2 |
| 16-bit Signed Integer | 3 |
| 32-bit Unsigned Integer | 4 |
| 32-bit Signed Integer | 5 |
| String | 6 |
| Float | 7 |
| Boolean | 8 |

TABLE 7

Inbound Type Values

| Inbound Type | Value |
|---|---|
| Command Return Value | 0 |
| Signal Received | 1 |
| Control Panel Interaction (key-value pair) | 2 |
| Configuration Value Changed (key-value pair) | 3 |
| Property Value Changed (key-value pair) | 4 |
| Method Call Invoked | 5 |

In accordance with the command protocol structures defined above, as shown in Table 8 below, the IoT connectivity module 1100, 1200 may acknowledge each packet that originates at the host 1120, 1220, which may similarly acknowledge each packet that originates at the IoT connectivity module 1100, 1200. Accordingly, in either case, the originating device may resend the packet in response to receiving an acknowledgement packet that has a value set to '1' to trigger a resend.

TABLE 8

Acknowledgment Message Values

| Acknowledgement Type | Value |
|---|---|
| Transmission OK | 0 |
| Resend | 1 |

In accordance with the various command protocol structures defined above, Table 9 below shows various commands that may be exposed to the host 1120, 1220.

TABLE 9

Supported Commands

| Type | Name | Description |
|---|---|---|
| Packet Send/Receive | GetInboundPkts( ) | Start receiving inbound packets from IoT connectivity module. |
| Device Configuration | SetDeviceInfo (key, value) | Send basic device configuration data; key sent as a string. |
| | GetDeviceInfo (key) | Retrieve basic device configuration data (e.g., display name, manufacturer name, onboarding state, etc.). Returned value data type known at MCU based on prior knowledge about property being retrieved (IoT connectivity module does not need to specify Data Type field in returned packet). |
| | FactoryReset( ) | Reset IoT connectivity module to factory settings. |
| Interface Configuration | GetSupportedInterfaces( ) | Returns pre-configured interfaces on IoT connectivity module; Interface names returned as strings. |
| | SetEnabledInterface(InterfaceName) | Enable the IoT connectivity module interface identified via the "InterfaceName" string. |
| | DefineInterfaceName(InterfaceName, NewInterfaceName) | Rename a generic interface built-into the IoT connectivity module (e.g., to create a specific new interface from a generic built-in interface). |
| Control Panel | TBD | TBD |
| Signals (Configuration) | DefineSignal(InterfaceName, oldname, newname) | Name signals, usually according to a generic interface built-into the IoT connectivity module. |
| Properties (Configuration) | DefineProperty(InterfaceName, oldname, newname) | Name properties, usually according to a generic interface built-into the IoT connectivity module. |
| Methods (Configuration) | DefineSignalDescription(Interface Name, SignalName, Language, Description) | Set signal text description (e.g., to create events). |
| | DefineMethodDescription(Interface Name, MethodName, Language, Description) | Set method text description (e.g., to create actions). |
| Signals (Operational) | SendSignal(SignalName, Value1, Value2, . . . ValueN) | Data types are defined within each value packet. When signals are received, the IoT connectivity module will assert InboundAvail and then the MCU will request signal data using the GetInboundPkts command. |
| Notifications (Operational) | SendSimpleNotification(Priority, Language1, Text1, . . . LanguageN,TextN) | Send textual notifications according to priority. |
| Properties (Operational) | SetProperty(property, value) | Data type for the value not specified, as the IoT connectivity module will know the data type from the interface definition specifying the property. Property may be sent as a string. |
| | GetProperty(property) | Property sent as a string. Data type of the returned value is known by the MCU because the MCU has prior knowledge about the property being retrieved. The IoT connectivity module does not need to specify the returned value data type in the Data Type field of the returned packet. |
| Methods (Operational) | MethodReturnVal( ) | Used to return method response packets to the IoT connectivity module. Multiple packets can be used to return multiple return values to the IoT connectivity module. |
| | CallRemoteMethod( ) | Invoke remote method. |

As such, referring to FIG. 11, the host 1120 may initiate the example signaling flow shown therein at 1170 via sending a command packet to the IoT connectivity module 1100 (e.g., over a standard peripheral interconnect coupling the host 1120 to the IoT connectivity module 1100). The IoT connectivity module 1100 may then send an acknowledgement packet to the host 1120 at 1172, and the host 1120 may then send one or more parameter packets to the IoT connectivity module 1100 at 1174 in response to the acknowledgement packet having a '0' value, otherwise the host 1120 may resend the command packet to the IoT connectivity module in response to the acknowledgement packet having a '1' value until an acknowledgment message from the IoT connectivity module 1100 indicates that the command packet was successfully received. Furthermore, as mentioned above, the IoT connectivity module 1100 may send an acknowledgement packet to the host 1120 in response to each parameter packet, as depicted at 1176, wherein the host 1120 may either resend the previous packet or send a next packet in the queue depending on the value associated with the acknowledgement packet. According to various aspects, after the host 1120 has sent all the applicable parameter packets, the IoT connectivity module 1100 may invoke the appropriate command that was indicated at 1170 according to the various parameters indicated at 1174. At some subsequent point in time, the IoT connectivity module 1100 may receive inbound data destined to be delivered to the host 1120 and assert a dedicated interrupt line to notify the host 1120 that the inbound data has become available to consume at the host 1120, as depicted at 1178. In response thereto, the host 1120 may send a message to request the available inbound data, as depicted at 1180, and the IoT connectivity module may then send one or more packets that include the available inbound data to the host 1120, as depicted at 1182. Furthermore, as mentioned above, the host 1120 may send an acknowledgement packet to the IoT connectivity module 1100 in response to each packet that carries the available inbound data, as depicted at 1184, wherein the IoT connectivity module 1100 may either resend the previous inbound data packet or send the next inbound data packet depending on the value associated with the acknowledgement packet.

According to various aspects, referring now to FIG. 12, the example signaling flow shown illustrated therein may be initiated at the IoT connectivity module 1200 in response to the IoT connectivity module 1200 receiving inbound data destined to be delivered to the host 1220. In particular, in response to receiving the inbound data destined to be delivered to the host 1220, the IoT connectivity module 1200 may assert a dedicated interrupt line to notify the host 1220 that the inbound data has become available to consume at the host 1220, as depicted at 1278. In response thereto, the host 1220 may send a message to request the available inbound data, as depicted at 1280, and the IoT connectivity module 1200 may then send one or more packets that include the available inbound data to the host 1220, as depicted at 1282. Furthermore, as mentioned above, the host 1220 may send an acknowledgement packet to the IoT connectivity module 1200 in response to each packet that carries the available inbound data, as depicted at 1284, wherein the IoT connectivity module 1200 may either resend the previous inbound data packet or send the next inbound data packet depending on the acknowledgement packet value. At some subsequent point in time, the host 1220 may send a command packet to the IoT connectivity module 1200 based on the preceding inbound data, as depicted at 1270, and the IoT connectivity module 1200 may send an acknowledgement packet to the host 1220, as depicted at 1272. Accordingly, the host 1220 may then send one or more parameter packets to the IoT connectivity module 1200, which may send an acknowledgement packet to the host 1220 in response to each parameter packet in a similar manner as described above, as depicted at 1274, 1276. As such, after the host 1220 has sent all the applicable parameter packets, the IoT connectivity module 1200 may invoke the appropriate command that was indicated at 1270 according to the various parameters indicated at 1274 and the communication between the host 1220 and the IoT connectivity module 1200 may continue as such.

According to various aspects, FIG. 13 through FIG. 17 illustrate various example use cases that may implement the IoT connectivity module described in further detail above. As such, for brevity and ease of description, the following description relating to the example use cases shown in FIG. 13 through FIG. 17 focuses on certain details specific to such cases, whereby various details relating to certain components and/or functions associated with the example use cases shown in FIG. 13 through FIG. 17 may be omitted herein to the extent that the same or similar details have already been provided in the above. Accordingly, those skilled in the art will appreciate that the various example use cases shown in FIG. 13 through FIG. 17 may include various additional components and/or functions that are the same or substantially similar to those described above with respect to an IoT connectivity module that may be integrated with an otherwise non-connected host to thereby transform the non-connected host into a connected IoT device whether or not explicitly described herein.

Figure 13:
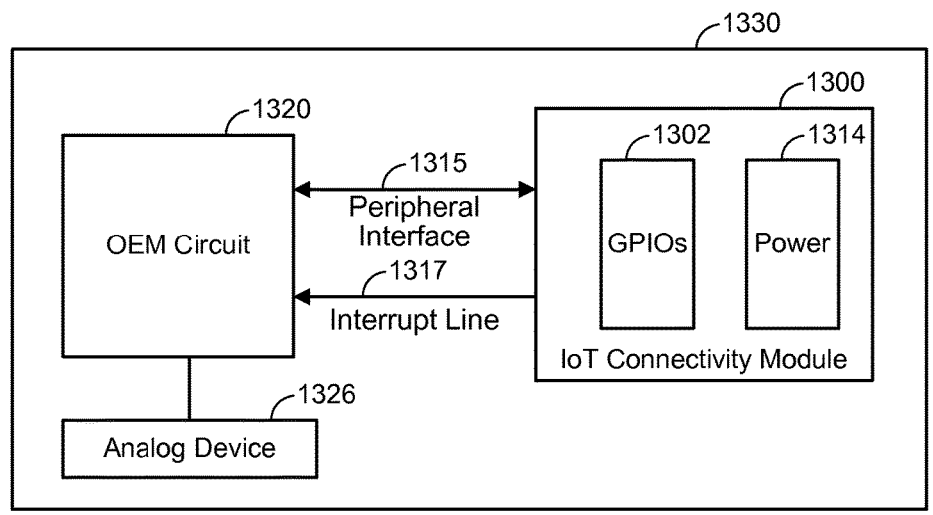
FIG. 13 illustrates an exemplary implementation in which a connectivity module may add connectivity to an analog device, according to various aspects.

Referring now to FIG. 13, an example use case is illustrated in which an IoT connectivity module 1300 may be coupled to an original equipment manufacturer (OEM) circuit 1320 in order to add connectivity to an analog device 1326 (e.g., an outlet, switch, button, fan, light fixture, garage door opener, sensor, etc.). More particularly, in the example use case shown in FIG. 13, the IoT connectivity module 1300 may include a power module 1314 and one or more GPIO pins 1302. As such, the analog device 1326 may connect to the IoT connectivity module 1300 through the OEM circuit 1320, which may integrate with the IoT connectivity module 1300 via a peripheral interface 1315 that in turn connects to the one or more GPIO pins 1302. Furthermore, in various embodiments, a dedicated interrupt signal line 1317 may be coupled to the OEM circuit 1320 and the IoT connectivity module 1300, wherein the IoT connectivity module 1300 may assert the dedicated interrupt signal line 1317 to notify the OEM circuit 1320 when incoming data becomes available to consume. As such, the example use case shown in FIG. 13 may allow an OEM to add connectivity to the analog device 1326 with no firmware development to thereby manufacture an analog IoT device 1330 through integrating the OEM circuit 1320 with the IoT connectivity module 1320 and connecting the analog device 1326 to the OEM circuit 1320. For example, at manufacturer, a configuration may be provided to define a device name, services to enable, a mapping between inputs associated with the GPIO pins 1302 and certain events, a mapping between certain actions and outputs associated with the GPIO pins 1302, a mapping between a control panel and the GPIO pins 1302, and human-readable text for events, actions, control panels, etc. Furthermore, the IoT connectivity module 1300 may provide various integration services that can be used to customize the connectivity (e.g., antenna integration, circuit integration, custom power requirements, etc.). As such, the IoT connectivity module 1300 that may be connected to the analog device 1326 through the OEM circuit 1320 may substantially reduce non-recurring engineering (NRE), a need to source firmware development, and quality assurance (QA) efforts to manufacture the analog IoT device 1330.

Figure 14:
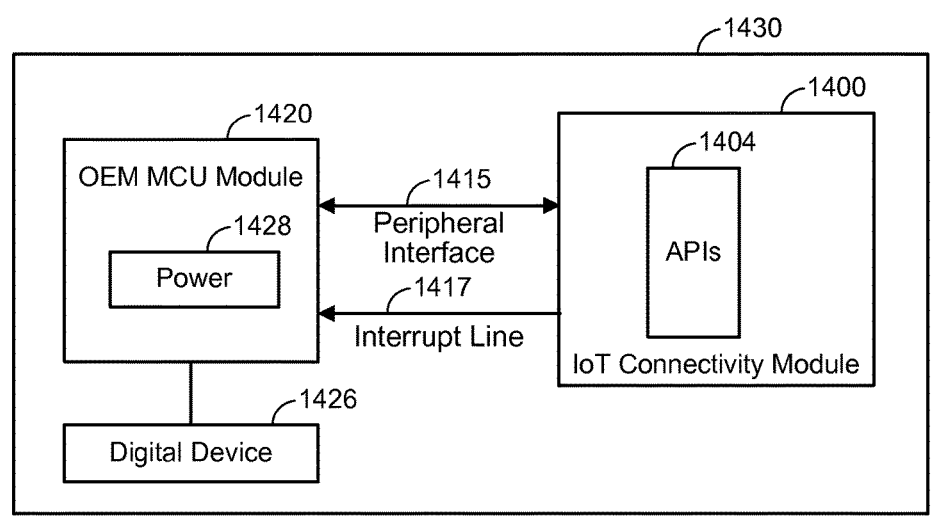
FIG. 14 illustrates an exemplary implementation in which a connectivity module may add connectivity to a digital device, according to various aspects.

Referring now to FIG. 14, an example use case is illustrated in which an IoT connectivity module 1400 may be coupled to an OEM MCU module 1420 in order to add connectivity to a digital device 1426 (e.g., a high-end kitchen appliance). More particularly, in the example use case shown in FIG. 14, the OEM MCU module 1420 may have local power 1428 and integrate with the IoT connectivity module 1400 via a peripheral interface 1415 (e.g., UART, SPI, I$^2$C, etc.) and one or more APIs 1404, thereby allowing an OEM to add connectivity to the digital device 1426 with minimal (if any) changes to existing applications. Furthermore, in various embodiments, a dedicated interrupt signal line 1417 may be coupled to the OEM MCU module 1420 and the IoT connectivity module 1400, wherein the IoT connectivity module 1400 may assert the dedicated interrupt signal line 1417 to notify the OEM MCU module 1420 when incoming data becomes available to consume. Furthermore, at manufacturer, a configuration may be provided to define a device name, services to enable, and human-readable text for events, actions, control panels, etc. Furthermore, the IoT connectivity module 1400 may likewise provide various integration services that can be used to customize the connectivity (e.g., antenna integration, circuit integration, custom power requirements, etc.). As such, the IoT connectivity module 1400 that may be connected to the digital device 1426 through the OEM MCU module 1420 may substantially reduce NRE and QA efforts, require no porting, and simplify adding base services to the digital device 1426 to manufacture a digital IoT device 1430.

Figure 15:
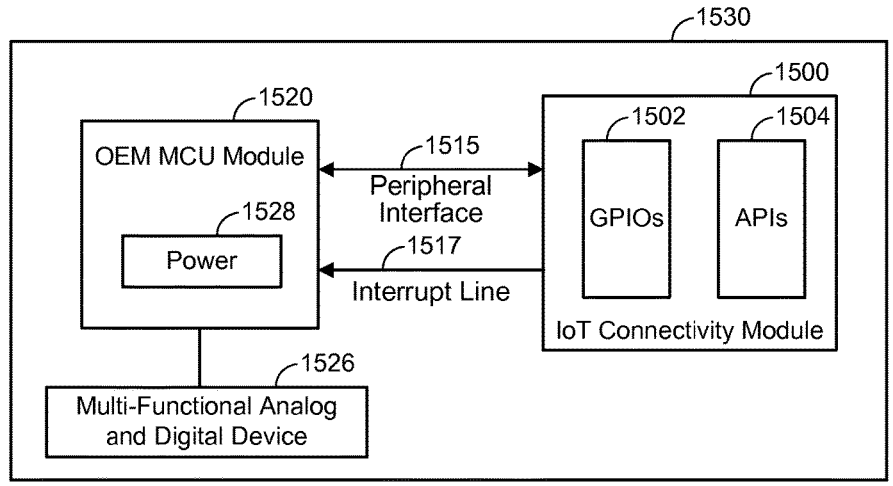
FIG. 15 illustrates an exemplary implementation in which a connectivity module may add connectivity to a multi-functional analog and digital device, according to various aspects.

Referring now to FIG. 15, an example use case is illustrated in which an IoT connectivity module 1500 may add connectivity to a multi-functional device 1526 having analog and digital capabilities, wherein the IoT connectivity module 1500 shown in FIG. 15 may generally combine the capabilities provided through the IoT connectivity module 1300 shown in FIG. 13 and the IoT connectivity module 1400 shown in FIG. 14. More particularly, in the example use case shown in FIG. 15, the multi-functional device 1526 may connect to the IoT connectivity module 1500 via an OEM MCU module 1520 that has local power 1528 and analog and digital capabilities, wherein the OEM MCU module 1520 having the having analog and digital capabilities may integrate with one or more APIs 1504 and one or more GPIO pins 1502 associated with the IoT connectivity module 1500 via a peripheral interface 1515 (e.g., a UART, SPI, I²C, and/or other suitable standard peripheral interface). Furthermore, as with the example use cases shown in FIG. 13 and FIG. 14, a dedicated interrupt signal line 1517 may be coupled to the OEM MCU module 1520 and the IoT connectivity module 1500 such that the IoT connectivity module 1500 may assert the dedicated interrupt signal line 1517 to notify the OEM MCU module 1520 when incoming data becomes available to consume. Accordingly, the one or more GPIO pins 1502 may provide connectivity to one or more analog components in the multi-functional device 1526 through the OEM MCU module 1520 and one or more APIs 1504 may connect to one or more digital interfaces associated with the OEM MCU module 1520 to provide connectivity to one or more digital components associated with the multi-functional device 1526, thereby creating a multi-functional analog and digital IoT device 1530.

Figure 16:
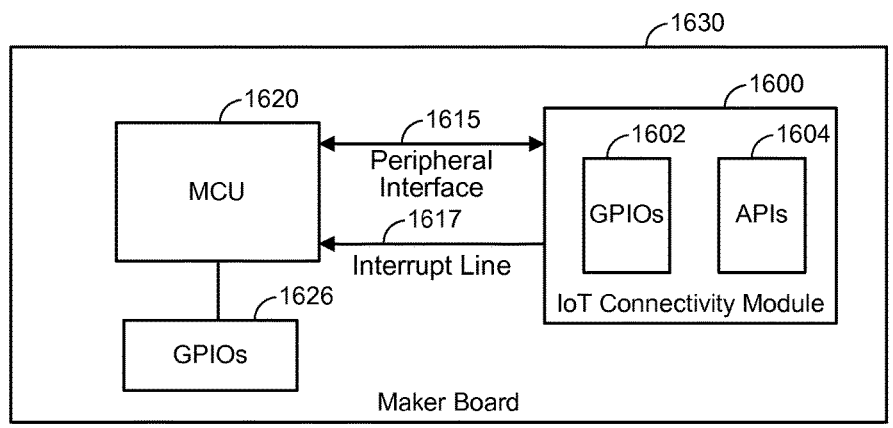
FIG. 16 illustrates an exemplary implementation in which a connectivity module may add connectivity to a maker board, according to various aspects.

Referring now to FIG. 16, an example use case is illustrated in which an IoT connectivity module 1600 may be used to add connectivity to a maker board 1630 (e.g., an Arduino board, a Beaglebone board, a Raspberry Pi board, or other suitable do-it-yourself (DIY) maker boards). More particularly, according to various aspects, the maker board 1630 may comprise one or more GPIO pins 1626 and/or other suitable electronic components coupled to an MCU 1620 or other suitable processor, which may integrate with the IoT connectivity module 1600 one or more GPIO pins 1602 and one or more APIs 1604 associated with the IoT connectivity module 1600 via a peripheral interface 1615. Accordingly, the maker board 1630 may leverage benefits associated with a proximal device-to-device (D2D) communication framework implemented on the IoT connectivity module 1600 to easily communicate with other nearby devices peer-to-peer. Furthermore, as with the example use cases shown in FIG. 13-15, a dedicated interrupt signal line 1617 may be provided from the IoT connectivity module 1600 to MCU 1620 on the maker board 1630, whereby the MCU 1620 may determine when incoming data becomes available to consume in response to the IoT connectivity module 1600 asserting the dedicated interrupt signal line 1617. In an alternative use case, the IoT connectivity module 1600 may have a standalone architecture, in which case the maker board 1630 may not necessarily have the MCU 1620. Furthermore, depending on the particular use case, the IoT connectivity module 1600 may have a form factor designed to fit the particular maker board 1630 according to any applicable shield requirements that may be associated therewith. Additionally, in a similar manner to the example use cases described above with respect to FIG. 13 through FIG. 15, a configuration may be defined within the IoT connectivity module 1600 to specify a device name, one or more enabled services, a mapping between GPIO pins 1602, 1626 and one or more events, actions, and/or control panel services, human-readable text for the one or more events, actions, and/or control panel services, etc. As such, the IoT connectivity module 1600 integrated into the maker board 1630 may substantially reduce learning curves, provide compatibility with various DIY platforms and form factors, and support small MCUs 1620, among other advantages.

Figure 17:
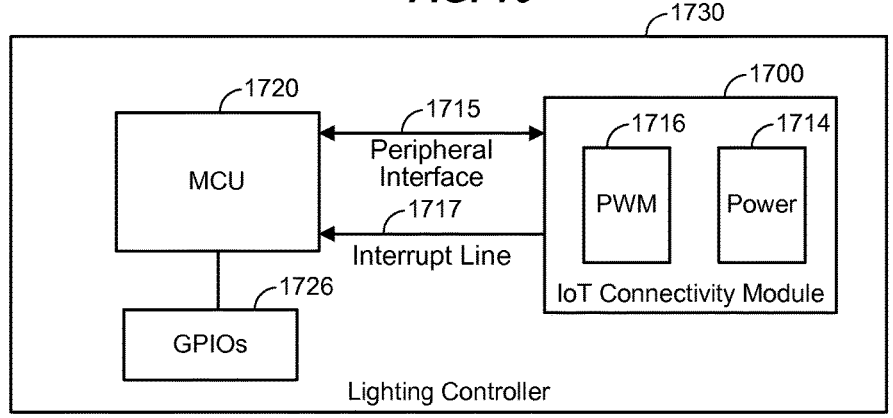
FIG. 17 illustrates an exemplary implementation in which a connectivity module may add connectivity to a lighting controller, according to various aspects.

Referring now to FIG. 17, an example use case is illustrated in which an IoT connectivity module 1700 may be used to add connectivity to a lighting controller 1730. In the particular use case shown in FIG. 17, the IoT connectivity module 1700 may include a power module 1714 and a pulse-width modulation (PWM) module 1716. For example, according to various aspects, the PWM module 1716 may control a width associated with one or more electrical pulses to control power delivered from the power module 1714 to a lighting system through the lighting controller 1730. In general, the IoT connectivity module 1700 may implement a lighting service framework to provide a turn-key solution that may be used to build a connected multicolor light emitting diode (LED) lighting system that can be integrated into the lighting controller 1730 via a peripheral interface 1715 coupling the IoT connectivity module 1700 to an MCU 1720 that is further coupled to one or more GPIO pins 1726. Furthermore, as with the example use cases shown in FIG. 13-16, a dedicated interrupt signal line 1717 may be provided from the IoT connectivity module 1700 to the MCU 1720, which may discover that incoming data has become available to consume in response to the IoT connectivity module 1700 asserting the dedicated interrupt signal line 1717. As such, the IoT connectivity module 1700 that may be integrated into the lighting controller 1730 may substantially reduce NRE associated with smart lighting development, reduce lighting power consumption, lower a lighting bill of materials (BOM), and control lighting systems that may not have an MCU. In particular, according to various aspects, the lighting service framework may comprise a controller service and lamp service that can enable an embedded lighting device (e.g., a connected light bulb) to be controlled by the controller service. For example, according to various aspects, a lighting OEM can embed the lamp service in firmware associated with a lighting product to enable smart lighting features, and the controller server may be configured to find one or more devices in a proximal network that are running the lamp service and provide additional functionality to control the lighting devices in various ways (e.g., controlling multiple lights simultaneously, applying custom lighting effects, toggling lights on and off, retrieving power consumption and light details, setting brightness or hue, etc.).

Figure 18:
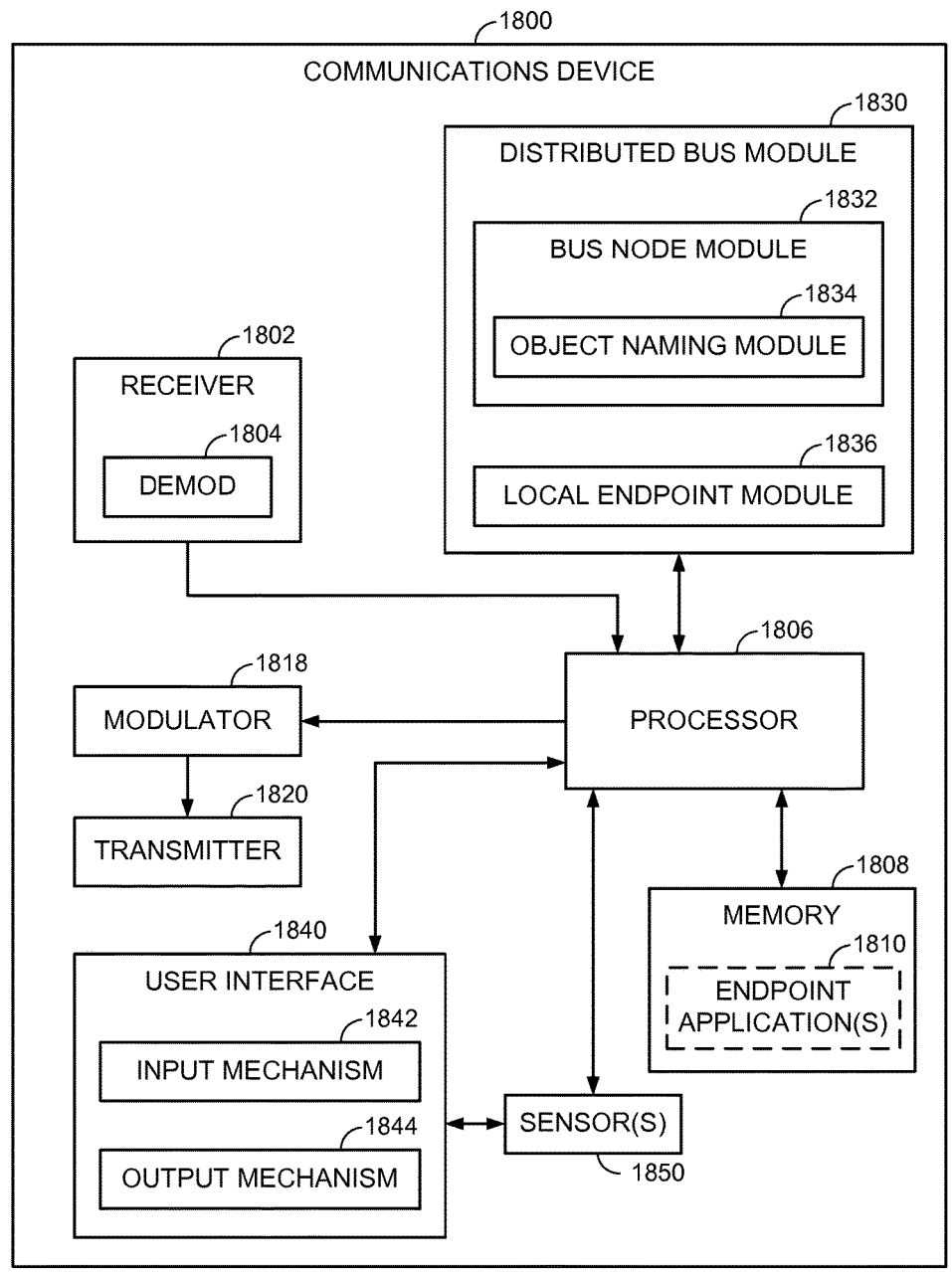
FIG. 18 illustrates an exemplary communications device that may support direct D2D communication with other proximal devices, in accordance with various aspects.

According to one aspect of the disclosure, FIG. 18 illustrates an exemplary communications device 1800 that may support direct D2D communication with other proximal devices in accordance with the various aspects and embodiments disclosed herein. For example, according to various aspects, the communications device 1800 shown in FIG. 18 may represent an IoT device that may result from integrating the connectivity module(s) described above with an otherwise non-connected host. In particular, as shown in FIG. 18, the communications device 1800 may comprise a receiver 1802 that may receive a signal from, for instance, a receive antenna (not shown), perform typical actions on the received signal (e.g., filtering, amplifying, downconverting, etc.), and digitize the conditioned signal to obtain samples. The receiver 1802 can comprise a demodulator 1804 that can demodulate received symbols and provide them to a processor 1806 for channel estimation. The processor 1806 can be dedicated to analyzing information received by the receiver 1802 and/or generating information for transmission by a transmitter 1820, control one or more components of the communications device 1800, and/or any suitable combination thereof.

In various embodiments, the communications device 1800 can additionally comprise a memory 1808 operatively coupled to the processor 1806, wherein the memory 1808 can store received data, data to be transmitted, information related to available channels, data associated with analyzed signal and/or interference strength, information related to an assigned channel, power, rate, or the like, and any other suitable information for estimating a channel and communicating via the channel. In one aspect, the memory 1808 can include one or more local endpoint applications 1810, which may seek to communicate with endpoint applications, services, etc., on the communications device 1800 and/or other communications devices (not shown) through a distributed bus module 1830. The memory 1808 can additionally store protocols and/or algorithms associated with estimating and/or utilizing a channel (e.g., performance based, capacity based, etc.).

Those skilled in the art will appreciate that the memory 1808 and/or other data stores described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1808 in the subject systems and methods may comprise, without being limited to, these and any other suitable types of memory.

In various embodiments, the distributed bus module 1830 associated with the communications device 1800 can further facilitate establishing connections with other devices. The distributed bus module 1830 may further comprise a bus node module 1832 to assist the distributed bus module 1830 with managing communications between multiple devices. In one aspect, the bus node module 1832 may further include an object naming module 1834 to assist the bus node module 1832 in communicating with endpoint applications associated with other devices. Still further, the distributed bus module 1830 may include an endpoint module 1836 to assist the local endpoint applications 1810 in communicating with other local endpoints and/or endpoint applications accessible on other devices through an established distributed bus. In another aspect, the distributed bus module 1830 may facilitate inter-device and/or intra-device communications over multiple available transports (e.g., Bluetooth, UNIX domain-sockets, TCP/IP, Wi-Fi, etc.). Accordingly, in one embodiment, the distributed bus module 1830 and the endpoint applications 1810 may be used to establish and/or join a proximity-based distributed bus over which the communication device 1800 can communicate with other communication devices in proximity thereto using direct device-to-device (D2D) communication.

Additionally, in one embodiment, the communications device 1800 may include a user interface 1840, which may include an input mechanism 1842 for generating inputs into the communications device 1800, and an output mechanism 1844 for generating information for consumption by the user of the communications device 1800. For example, the input mechanism 1842 may include one or more mechanisms such as a key or keyboard, a mouse, a touch-screen display, a microphone, etc. Further, for example, the output mechanism 1844 may include a display, an audio speaker, a haptic feedback mechanism, a Personal Area Network (PAN) transceiver etc. In the illustrated aspects, the output mechanism 1844 may include an audio speaker operable to render media content in an audio form, a display operable to render media content in an image or video format and/or timed metadata in a textual or visual form, or other suitable output mechanisms. However, in one embodiment, a headless communications device 1800 may not include certain input mechanisms 1842 and/or output mechanisms 1844 because headless devices generally refer to computer systems or device that have been configured to operate without a monitor, keyboard, and/or mouse.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects of the disclosure, those skilled in the art will appreciate that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An Internet of Things (IoT) connectivity module, comprising:
a connectivity chip configured to implement a wireless network platform;
one or more standard peripheral interfaces configured to provide an interconnect between the connectivity chip and a host having at least one processor such that the IoT connectivity module appears to the host as a physically attached peripheral device; and
a device-to-device (D2D) application configured to:
implement a command protocol and one or more communication services associated with a proximal D2D communication framework, wherein the command protocol and the one or more communication services enable direct D2D communication over a proximity-based distributed bus; and
expose the command protocol associated with the proximal D2D communication framework via the one or more standard peripheral interfaces.

2. The IoT connectivity module recited in claim 1, further comprising:
a dedicated interrupt line coupling the IoT connectivity module to the host, wherein the D2D application is configured to assert the dedicated interrupt line in response to data becoming available to consume at the at least one processor.

3. The IoT connectivity module recited in claim 2, wherein the one or more standard peripheral interfaces and the dedicated interrupt line comprise a physical interconnect between the IoT connectivity module and the host.

4. The IoT connectivity module recited in claim 2, wherein the one or more standard peripheral interfaces and the dedicated interrupt line comprise an in-chip virtual interconnect between the IoT connectivity module and the host.

5. The IoT connectivity module recited in claim 1, further comprising at least one application program interface configured to:
receive one or more commands associated with the exposed command protocol from the at least one processor over the one or more standard peripheral interfaces; and
invoke the one or more communication services associated with the proximal D2D communication framework to handle the one or more commands.

6. The IoT connectivity module recited in claim 1, further comprising:
embedded firmware configured to implement one or more interfaces bound to the proximal D2D communication framework.

7. The IoT connectivity module recited in claim 1, further comprising:
a memory configured to store a service configuration associated with the host interconnected to the IoT connectivity module.

8. The IoT connectivity module recited in claim 1, wherein the wireless network platform comprises at least a radio-frequency front end and one or more wireless radios.

9. An apparatus, comprising:
a connectivity chip configured to implement a wireless network platform;
one or more standard peripheral interfaces configured to provide an interconnect between the connectivity chip and a host having at least one processor such that the apparatus appears to the host as a physically attached peripheral device; and
means for implementing a command protocol and one or more communication services associated with a proximal device-to-device (D2D) communication framework and exposing the command protocol associated with the proximal D2D communication framework via the one or more standard peripheral interfaces, wherein the command protocol and the one or more communication services enable direct D2D communication over a proximity-based distributed bus.

10. The apparatus recited in claim 9, further comprising means for notifying the host in response to data becoming available to consume at the at least one processor.

11. The apparatus recited in claim 10, wherein the one or more standard peripheral interfaces and the means for notifying the host comprise a physical interconnect coupling the apparatus and the host.

12. The apparatus recited in claim 10, wherein the one or more standard peripheral interfaces and the means for notifying the host comprise an in-chip virtual interconnect.

13. The apparatus recited in claim 9, further comprising:
means for receiving one or more commands associated with the exposed command protocol from the at least one processor over the one or more standard peripheral interfaces; and
means for invoking the one or more communication services associated with the proximal D2D communication framework to handle the one or more commands.

14. The apparatus recited in claim 9, further comprising means for implementing one or more interfaces bound to the proximal D2D communication framework.

15. The apparatus recited in claim 9, further comprising means for storing a service configuration associated with the host.

16. The apparatus recited in claim 9, wherein the wireless network platform comprises at least a radio-frequency front end and one or more wireless radios.

* * * * *